United States Patent [19]

Sawada et al.

[11] Patent Number: 5,576,852
[45] Date of Patent: Nov. 19, 1996

[54] SYNCHRONIZATION SIGNAL GENERATING UNIT OF AN IMAGE FORMING APPARATUS

[75] Inventors: Kouichi Sawada; Yoshiyuki Ichihara; Jun Nakagawa, all of Hachioji, Japan

[73] Assignee: Konica Corporation, Tokyo, Japan

[21] Appl. No.: 366,906

[22] Filed: Dec. 30, 1994

[30] Foreign Application Priority Data

Jan. 14, 1994 [JP] Japan .................................. 6-002456
Mar. 30, 1994 [JP] Japan .................................. 6-061343

[51] Int. Cl.[6] ........................................................ H01J 3/14
[52] U.S. Cl. ........................................... 358/475; 358/481
[58] Field of Search ................................... 358/457, 481, 358/474–475; 359/214, 227, 232–233; 346/108

[56] References Cited

U.S. PATENT DOCUMENTS 4,906,094  3/1990  Ashida ..................................... 356/336
5,006,704  4/1991  Mochizuki et al. .................... 250/235
5,233,188  8/1993  Arimoto et al. ........................ 250/235
5,400,170  3/1995  Hanada .................................. 359/232

FOREIGN PATENT DOCUMENTS 57-39669   3/1982  Japan .
2-188713   7/1990  Japan .

*Primary Examiner*—Stephen Brinich
*Attorney, Agent, or Firm*—Finnegan, Henderson, Farabow, Garrett & Dunner, L.L.P.

[57] ABSTRACT

In an image forming apparatus for simultaneously recording plural image lines on a recording medium by scannintg simultaneously with plural light beams along parallel scanning lines in a primary scanning direction, before a deviation detector detects a deviation among the plural light beams in the primary scanning direction, a beam power controller adjusts the electric power for each light beam generator so that the beam diameter of each light beam is made equal to each other.

10 Claims, 18 Drawing Sheets

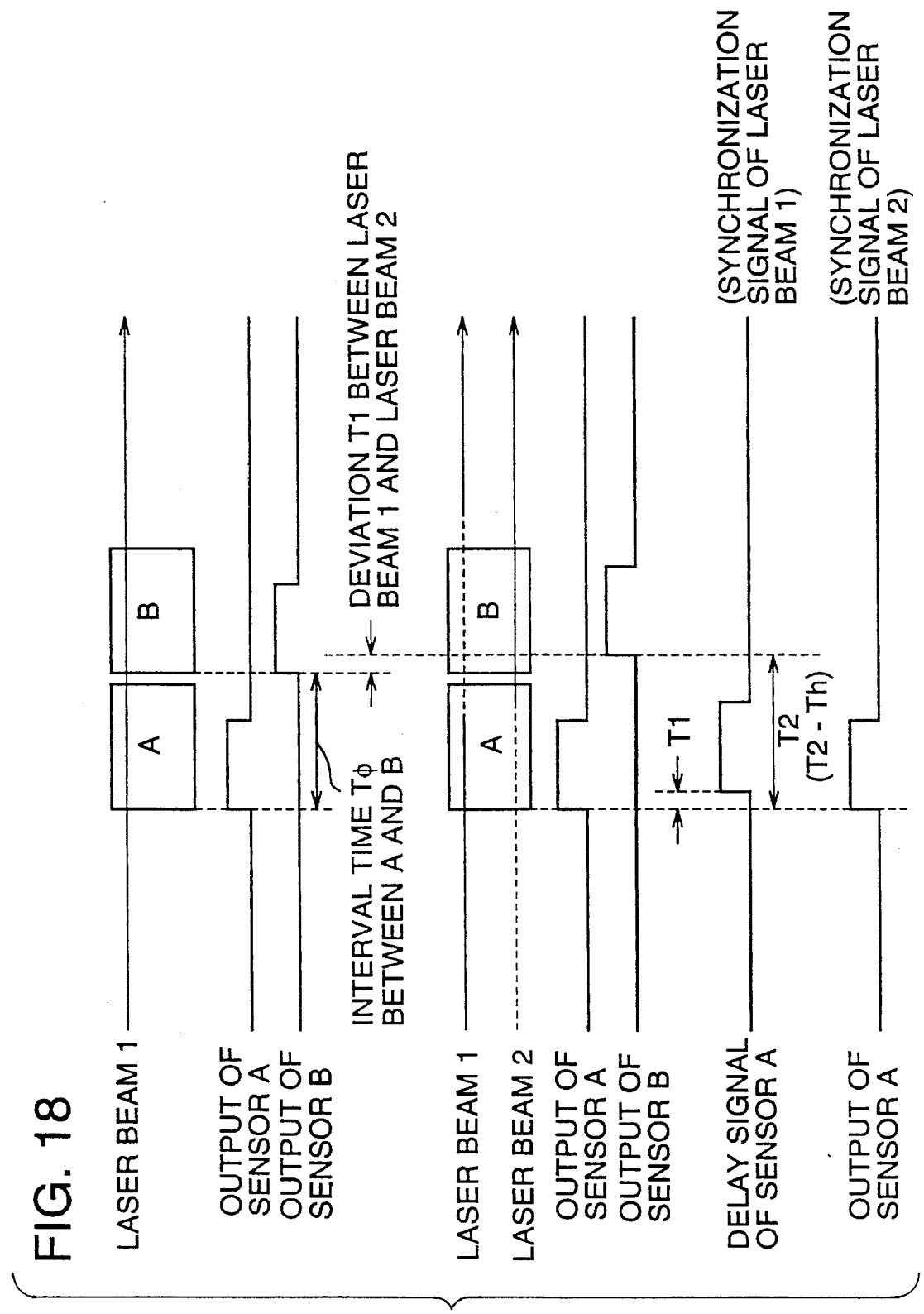

SYNCHRONIZATION SIGNAL GENERATING UNIT OF AN IMAGE FORMING APPARATUS

BACKGROUND OF THE INVENTION

The present invention relates to a synchronization signal generating unit of an image forming apparatus, and more particularly relates to a synchronization signal generating unit used for an image forming apparatus in which a plurality of light beams are simultaneously scanned so that a plurality of lines can be simultaneously recorded, the synchronization signal generating unit characterized in that the deviations of the plurality of light beams are detected in the scanning direction, and a synchronization signal corresponding to each light beam is generated in accordance with the result of the detection.

In an image forming apparatus, image information is recorded on a recording medium in such a manner that a laser beam (light beam) modulated in accordance with an image signal is deflected by a rotary polygonal mirror and scanned on the recording medium. In this image forming apparatus, in order to increase the recording speed, a plurality of laser beams are used and a plurality of lines are simultaneously recorded.

When a plurality of laser beams are simultaneously subjected to scanning in the manner described above, deviation tends to occur between the laser beams, so that the image recording position of each line deviates and stable image formation of high fidelity can not be made.

In order to solve the above problems, various apparatus are proposed in Japanese Patent Publication Open to Public Inspection Nos. 188713/1990 and 39669/1982. According to the apparatus, the operation is carried out as follows. The scanning position of each laser beam is detected, and a synchronization signal (horizontal synchronization signal) is generated for each beam. Therefore, even if the beam position deviates with respect to the scanning direction because of the environmental condition or aging change, image formation of high fidelity can be made.

For example, in the image forming apparatus disclosed in Japanese Patent Publication Open to Public Inspection No. 188713/1990, a synchronization signal corresponding to each beam is generated using one sensor when a plurality of beams are successively detected in the time series through a slit member.

In the synchronization signal generating unit disclosed in Japanese Patent Publication Open to Public Inspection No. 39669/1982, a synchronization signal corresponding to each beam is generated in accordance with a change in the output of a beam detecting means, utilizing that the output of the beam detecting means is changed stepwise by the number of incident beams.

The correlation between a current flowing in a semiconductor in the normal direction and an optical output corresponding to the current deviates among the individual semiconductor lasers. Further, it greatly deviates due to the environmental temperature. By the deviation of the optical output in a plurality of semiconductor lasers, the laser beam diameter deviates.

It is necessary that a synchronization signal is generated in accordance with the deviation of a beam center. However, when the beam diameter deviates, even if the position of the beam center is the same, the time of beam detection is quickened or delayed, so that an error is caused in the generation time of a synchronization signal.

The present invention has been achieved to solve the above problems. It is a first object of the present invention to provide a synchronization signal generating unit used for an image forming apparatus in which a plurality of light beams are simultaneously scanned for recording an image, the synchronization signal generating unit characterized in that the positional deviation of the light beam in the scanning direction is accurately detected, so that the synchronization signal corresponding to each light beam can be accurately generated.

In this connection, according to the construction disclosed in Japanese Patent Publication Open to Public Inspection No. 39669/1982, a horizontal synchronization signal of each laser beam is generated in accordance with a stepwise change in the output of the optical detector. Therefore, the time to generate a synchronization signal is changed being affected by the characteristics of the detection output of the optical detector. For this reason, the output characteristics of the optical detector must be highly accurate and stable.

According to the construction disclosed in Japanese Patent Publication Open to Public Inspection No. 188713/1990, unless the opening of a slit member is at a predetermined position relative to the primary scanning direction, deviation of the scanning position of the laser beam in the primary scanning direction is erroneously detected. Further, it is difficult to detect from the beam detection signal of the optical detector whether or not the aforementioned relative positional relation is correct. Therefore, it is necessary that the assembly is previously conducted with high accuracy and the synchronization signal is generated under the condition that the aforementioned predetermined positional relation is maintained.

The present invention has been achieved in view of the above problems. The second object of the present invention is to provide a synchronization signal generating unit characterized in that: a horizontal synchronization signal can be generated only in accordance with the result of detection of the light beam; and the accuracy of the horizontal synchronization signal generating time can be maintained high corresponding to the positional deviation of the construction for detecting the light beam.

SUMMARY OF THE INVENTION

In order to accomplish the first object described above, the present invention is to provide a synchronization signal generating unit used for an image forming apparatus in which a plurality of light beams are simultaneously scanned on a recording medium so that a plurality of lines are simultaneously recorded. In the synchronization signal generating unit, a deviation detecting means detects a deviation of the scanning position of each of the plurality of light beams, and the synchronization signal generating means generates a synchronization signal used for image recording for each light beam in accordance with the deviation in the scanning direction detected by the deviation detecting means. In this case, a beam power adjusting means adjusts the power of each of the plurality of beams so that the power can be the same, wherein this adjustment is carried out immediately before the operation of the aforementioned detecting means.

In the synchronization signal generating unit of the image forming apparatus described above, the plurality of light beams are respectively laser beams outputted from the semiconductor lasers, and the beam power adjusting means determines a current of the semiconductor laser so that the optical output of the semiconductor laser can be a predetermined value.

In the synchronization signal generating unit of the image forming apparatus described above, the deviation detection means is provided with a plurality of beam detecting means, the number of which coincides with the number of the plurality of light beams, wherein the plurality of beam detecting means are arranged in the scanning region in parallel with the scanning direction. The deviation between the beams in the scanning direction is detected as a deviation between the generation interval of the detection signal in each beam detection means when each of the plurality of beam detection means detects the same one light beam, and the generation interval of the detection signal in each beam detection means when each of the plurality of beam detection means detects one different light beam.

In the synchronization signal generating unit of the image forming apparatus described above, a detection signal generated when the light beam taking the lead in the scanning operation is detected by the beam detection means is made to be a reference synchronization signal, and a synchronization signal corresponding to other light beams which conduct scanning being delayed with respect to the light beam taking the lead is generated when the reference synchronization signal is delayed by a period of time corresponding to the deviation of the scanning position with respect to the light beam taking the lead.

In the synchronization signal generating unit of the image forming apparatus described above, the synchronization signal generating means is constructed in the following manner. The detection signal of each beam detection means generated when each of the plurality of beam detection means detects only one different light beam, is subjected to delay processing in accordance with the generation interval of the detection signal in each beam detection means when each of the plurality of beam detection means detects only the same one light beam. In this way, the synchronization signal for each light beam is generated.

According to the synchronization signal generating unit for accomplishing the first object of the present invention, the deviations of a plurality of light beams in the scanning direction which conduct simultaneous scanning are detected, and in accordance with the detected deviation, a synchronization signal for image recording is generated for each light beam. Immediately before the deviation detection, each light beam is adjusted so that the beam power can be the same. Under the condition that the beam power is the same, the deviation is detected.

When the beam power is different among the light beams, the beam diameters deviates. Due to the fluctuation of the beam diameters, errors are caused in the detection of the scanning position. In order to solve the above problem, the beam power is adjusted and the fluctuation of each light beam diameter is reduced, and then the deviation of the scanning position is detected. Therefore, the deviation of the scanning position can be accurately detected without being affected by the fluctuation of the beam diameter.

The light beam is outputted from the semiconductor laser. When a current made to flow in the semiconductor laser is determined so that the optical output of the semiconductor laser can be a predetermined value, the beam power is adjusted.

The optical output of the semiconductor laser can be provided by the light receiving element as a monitor current. When a current is adjusted in accordance with a comparison made between the thus obtained monitor current and the drive current corresponding to the target optical output, the target optical output can be provided.

A plurality of beam detection means, the number of which coincides with that of the plurality of light beams, are arranged in the scanning region in the scanning direction, and each beam detection means detects only the same one light beam. The generation interval of the detection signal of each beam detection means at this time is determined only by the scanning speed of the light beam and the positional interval of the beam detection means.

When each of the plurality of beam detection means detects only one different light beam, the generation interval of the detection signal in each beam detection means is affected and changed by the scanning speed of the light beam, the positional interval of each beam detection means and the deviation of the scanning position of each beam. Accordingly, when the generation intervals are compared with each other, a deviation of the generation interval of the detection signal can be represented by a change caused by the deviation of the scanning position.

When the deviation of the scanning position is detected, the synchronization signal of the light beam is generated in the following manner. The detection signal of the light beam taking the lead in the scanning operation is made to be a reference synchronization signal, and thus obtained reference synchronization signal is delayed by an amount corresponding to the light beam which takes the lead.

The synchronization signal corresponding to each light beam is obtained by the delay processing in the same manner. In this case, a detection signal generated when only one different light beam is detected by each beam detection means is delayed in accordance with the reference generation interval which is found when the same one light beam is detected. In this way, the synchronization signals are successively generated by the deviation of the generation interval caused by the deviation of the scanning position except for the reference generation interval.

In the synchronization signal generating unit of an image forming apparatus to accomplish the second object of the present invention, a plurality of light beam simultaneously conducts scanning on a recording medium in a direction parallel with the scanning direction, so that a plurality of lines are simultaneously recorded. At least one pair of light beam detection means are provided in the primary scanning direction. A horizontal synchronization signal is generated for each light beam in accordance with the time at which each light beam detection means detects the same light beam, and also in accordance with the time at which each light beam detection means respectively detects a different light beam, and also in accordance with the deviation of the detection time corresponding to the scanning position in the subsidiary scanning direction with respect to the light beam detection means.

In the above synchronization signal generating unit, the deviation of the detection time of each light beam in accordance with the scanning position in the subsidiary scanning direction with respect to the light beam detection means is previously determined by a difference between an interval of the time at which each light beam detecting means detects the same light beam, and an interval of the time at which each light beam detecting means respectively detects a different light beam, and also the deviation of the detection time of each light beam in accordance with the scanning position in the subsidiary scanning direction with respect to the light beam detection means is previously determined by the initial data of an amount of the deviation of the scanning position in the primary scanning direction of each beam.

In the above synchronization signal generating unit, the deviation of the detection time of each light beam in accordance with the scanning position in the subsidiary scanning direction with respect to the light beam detection means is previously determined by a difference between an interval of the time at which each light beam detecting means detects the same light beam, and an interval of the time at which each light beam detecting means respectively detects a different light beam when the scanning is conducted while the scanning position of each light beam in the primary scanning direction coincides with each other.

In the unit described above, a detection signal obtained when each light beam detecting means respectively detects a different light beam is delayed in accordance with the interval of the time at which each light beam detecting means detects the same light beam, and also in accordance with the deviation time between the light beams according to the scanning position in the subsidiary scanning direction with respect to the light beam detecting means. Then a horizontal synchronization signal for each light beam is generated in accordance with the delayed detecting signal and the not-delayed detecting signal.

In the unit described above, a detection signal obtained when each light beam detecting means respectively detects a different light beam is delayed in accordance with a difference between the interval of the time at which each light beam detecting means detects the same light beam and also the interval of the time at which each light beam detecting means respectively detects a different light beam, and also in accordance with the deviation time between the light beams according to the scanning position in the subsidiary scanning direction with respect to the light beam detecting means. Then a horizontal synchronization signal for each light beam is generated in accordance with the delayed detecting signal and the not-delayed detecting signal.

According to the synchronization signal generating unit of an image forming apparatus for accomplishing the second object of the present invention, a plurality of lines are simultaneously recorded by a plurality of light beams, and a horizontal synchronization signal is generated for each light beam so as to cope with the deviation of the scanning position of each light beam in the primary scanning direction.

In this case, in order to generate a horizontal synchronization signal for each light beam, at least one pair of light beam detecting means are provided in the primary scanning direction. The time is detected at which the same light beam is detected by the light beam detecting means, and also the time is detected at which a different light beam is detected by each light detection means. If the scanning is carried out without the positional deviation of each beam in the primary scanning direction, both the detection time described above must coincide with each other. When the time does not coincide, it shows that the scanning position is deviated in the primary scanning direction.

However, when a detecting region of the light beam detecting means is not parallel with the subsidiary scanning direction, that is, when a detecting region of the light beam detecting means is inclined with respect to the subsidiary scanning direction, the detecting time is deviated according to the subsidiary scanning position. This deviation is erroneously detected as the deviation of the scanning position in the primary scanning direction. Therefore, in accordance with the deviation of the detecting time between the light beams generated according to the inclination of the light beam detecting means, the generation time of a horizontal synchronization is corrected, and the occurrence of an error of the writing time of each beam is avoided.

In the unit described above, in the case where the initial data of the deviation of the scanning position of each beam in the primary scanning direction is known, a difference between the deviation of the primary scanning position and the initial data detected by the light beam detecting means in the initial condition can be assumed to be an error caused by the inclination of the light beam detecting means. Accordingly, the aforementioned difference is previously set to be the deviation of the detecting time at the subsidiary scanning position between the light beams.

In the unit described above, under the condition that each light beam is made to coincide with the scanning position in the primary scanning direction, the deviation of the scanning position is detected in the primary scanning direction. In this way, an error caused by the inclination of the light beam detecting means is detected, and the error is previously set to be the deviation of the detecting time at the subsidiary scanning position between the light beams.

In the unit described above, a detection signal obtained when each light beam detecting means respectively detects a different light beam is delayed in accordance with the interval of the time at which the same light beam is detected. In this way, a difference of the output time generated by the interval of the light beam detecting means is eliminated between the delayed detecting signal and the not-delayed detecting signal, so that a difference of the time can be provided corresponding to the deviation of the scanning position in the primary scanning direction. When the light beam detecting means is inclined, an error caused by this inclination is included in the difference of time after the delay processing. Therefore, when the delay processing is carried out, a correction is made so as to correct the deviation of the time corresponding to the error.

In the unit described above, according to a difference between an interval of the time at which the same light beam is detected and an interval of the time at which a different light beam is detected, the deviation of the primary scanning position is found between the light beams. In this case, an error caused by the inclination of the light beam detecting means is included in the deviation. Therefore, this error is corrected, and the deviation of the scanning position is finally set. According to the deviation, the detecting signal is delayed. In this way, the original detecting signal to be delayed and the detecting signal subjected to the delay processing are set to provide an interval corresponding to the primary scanning position of the light beam.

BRIEF DESCRIPTION OF THE DRAWINGS

FIG. 18 is a time chart showing the characteristics of generation of the synchronization signal in the second example.

DETAILED DESCRIPTION OF THE INVENTION

Figure 1:
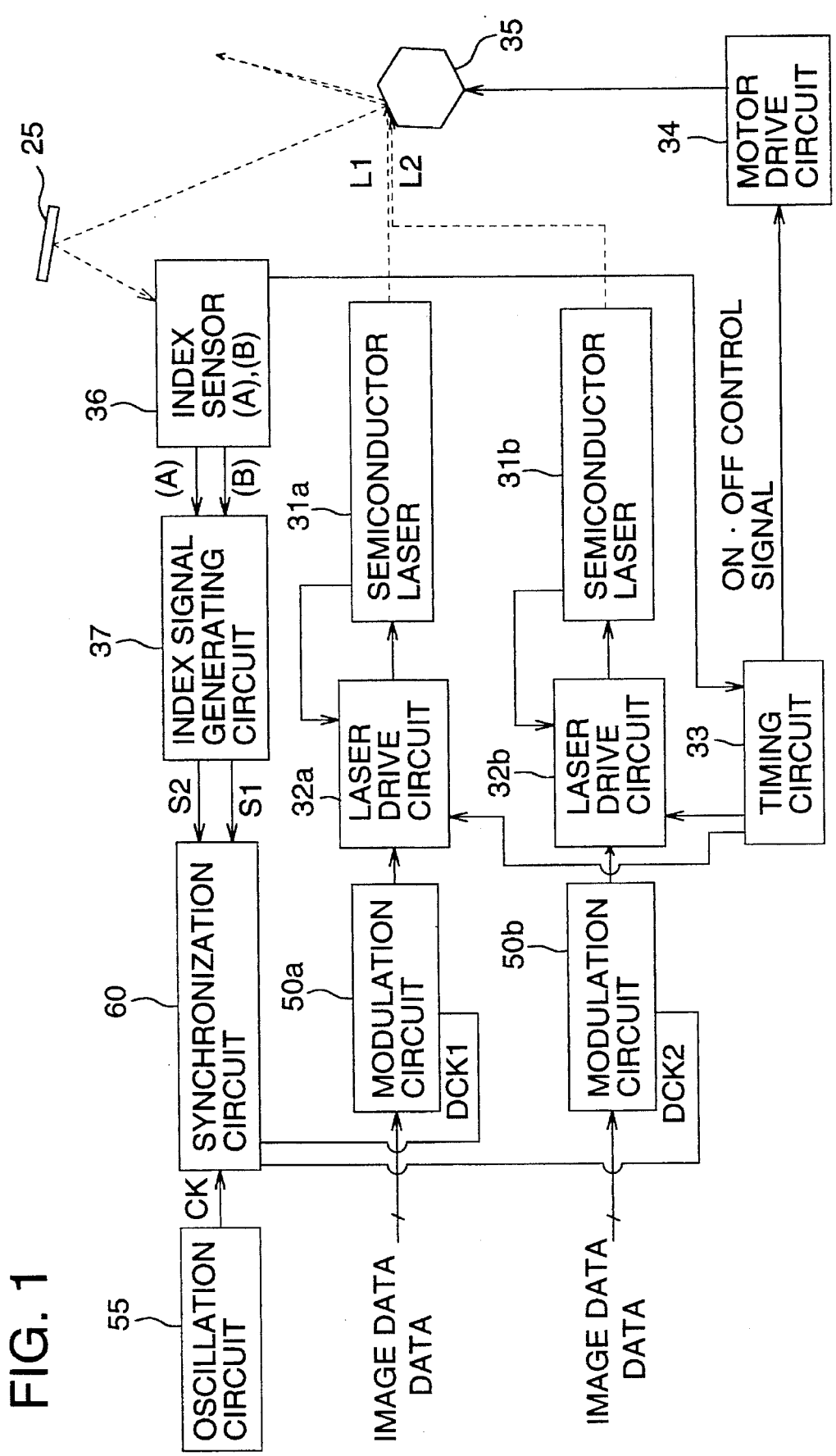
FIG. 1 is a block diagram showing a system construction of the example of the present invention.

FIG. 1 is a block diagram showing the essential construction of the laser printer of the example of the image forming apparatus of the present invention. According to the laser printer of this example, two laser beams (light beams) are modulated in accordance with image data, and scanned in the primary scanning direction so that the two lines are simultaneously recorded.

In FIG. 1, digital image data DATA of each line is respectively supplied to the modulation circuits 50a, 50b. In modulation circuits 50a, 50b, signals are formed in accordance with each image data DATA and data clocks DCK1, DCK2.

Signals sent from the modulation circuits 50a, 50b are respectively supplied to the semiconductor lasers 31a, 31b through the laser drive circuit (laser drive ICs) 32a, 32b. Due to the foregoing, image recording is made.

The laser drive circuits 32a, 32b are individually controlled by control signals sent from the timing circuit 33 so that the laser drive circuits 32a, 32b are driven only in the horizontal and vertical effective region. In this connection, the timing circuit 33 has a function by which the laser beams L1, L2 are selectively turned on for the purpose of generating index signals S1, S2 (synchronization signals) described later.

Signals (light emission voltage) representing the optical output of the laser beam are fed back from the semiconductor lasers 31a, 31b to the laser drive circuits 32a, 32b. The laser drive circuits 32a, 32b adjust electric currents flowing in the semiconductor lasers 31a, 31b in the normal direction in accordance with the signals, so that the laser power can be automatically controlled.

Two laser beams L1, L2 respectively outputted from the semiconductor lasers 31a, 31b are sent to and deflected by the rotary polygonal mirror 35 and scanned on a photoreceptor (recording medium) not shown in the drawing. Scanning start points of the laser beams L1, L2 deflected by the polygonal mirror 35 are detected by the index sensor (beam detecting means) 36 provided on the fore end side of the scanning region. A detection signal of the index sensor 36 is supplied to the index signal (synchronization signal) generating circuit 37. This index signal generating circuit 37 forms index signals (horizontal synchronization signals) S1, S2 for controlling the start of recording of laser beams L1, L2.

Index signals S1, S2 are sent to the synchronization circuit 60. Fundamental clock CK, the frequency of which is predetermined, is sent from the oscillating circuit 55 to the synchronization circuit 60, and dividing outputs DCK1, DCK2 synchronized with the index signals S1, S2 are outputted. Dividing outputs DCK1, DCK2 are respectively supplied to the modulation circuits 50a, 50b as a data clock (dot clock).

Numeral 34 is a motor drive circuit for rotating the polygonal mirror 35. The polygonal mirror 35 is subjected to on-off control by a signal sent from the timing circuit.

Figure 2:
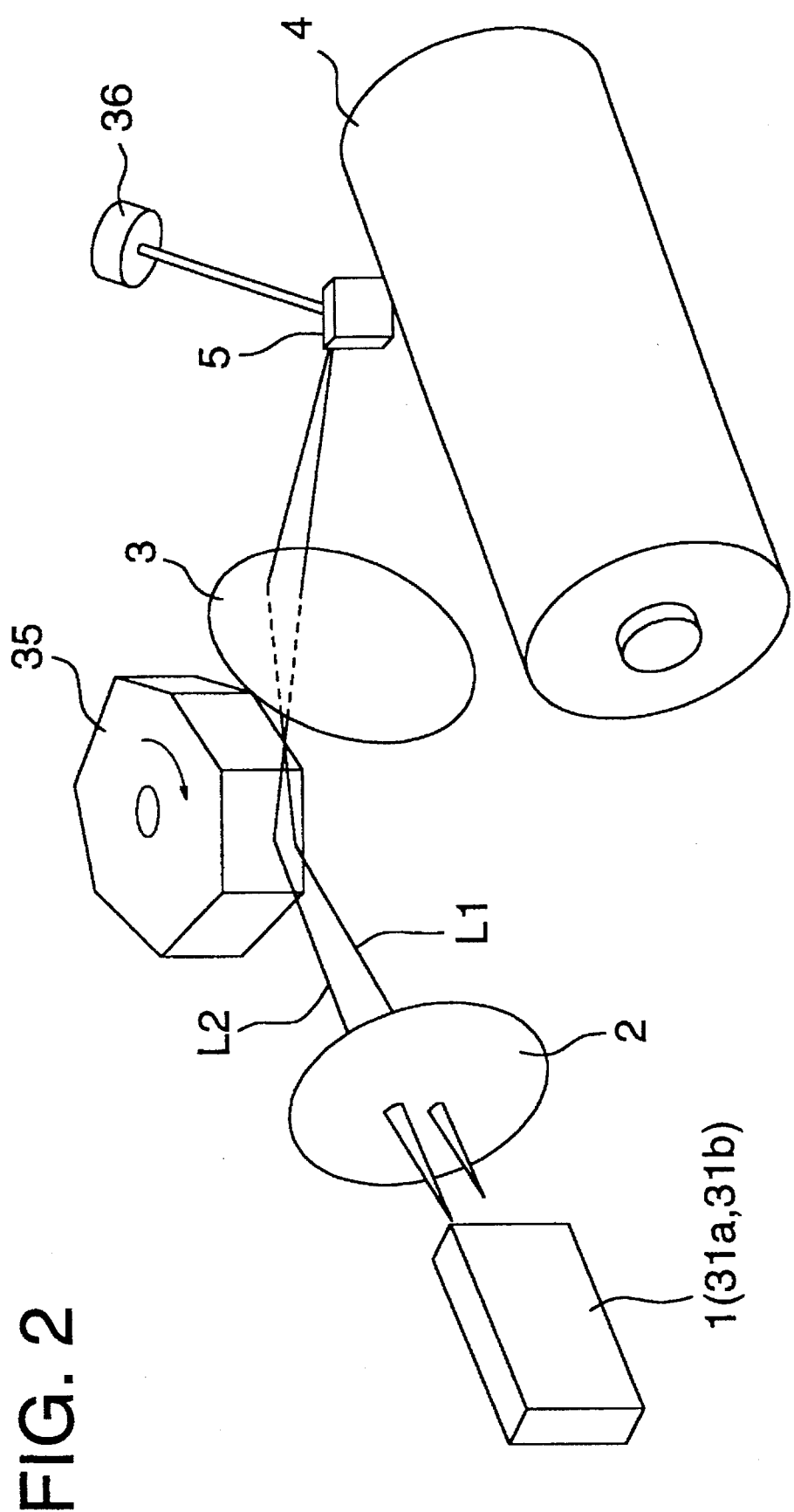
FIG. 2 is a perspective view of the image exposure system of the above example.

FIG. 2 is a view showing an example of the image exposure system in which the laser beams L1, L2 forms an image.

In FIG. 2, the light source unit 1 is compose of two semiconductor laser units 31a, 31b aligned in a line. Two beams of divergent light emitted from the light source unit 1 are made to be two parallel laser beams L1, L2 by the action of the condenser lens 2.

Two laser beams L1, L2 are irradiated on the polygonal mirror 35. Two laser beams L1, L2 deflected by the polygonal mirror 35 pass through the fθ lens 3. Then two laser beams L1, L2 conduct scanning on the photoreceptor drum (recording medium) 4.

Due to the foregoing, the photoreceptor drum 4 is simultaneously exposed with two lines of laser beams L1, L2 so that an electrostatic latent image is formed on the photoreceptor drum 4. Development is made in such a manner that toner particles electrically charged to the reverse polarity are deposited on the electrostatic latent image. Then a recording sheet is put on the toner image, and an electric charge, the polarity of which is reverse to the corona charging polarity, is given onto the recording sheet from the reverse side. In this way, the toner image is transferred onto the recording sheet.

In this connection, the reflecting mirror 5 guides the laser beams L1, L2 to the index sensor 36 when the laser beams L1, L2 are irradiated on the end of the scanning line.

An example of the present invention to accomplish the first object will be explained as follows.

In order to generate the index signals S1, S2 corresponding to the laser beams L1, L2 in accordance with the positional deviations of the laser beams L1, L2 in the scanning direction, it is necessary to detect a correlation of the laser beams L1, L2, that is, it is necessary to detect a positional deviation in the scanning direction. In this example, the detection of the positional deviation and the control of generation of the index signals S1, S2 are conducted as illustrated in the flow chart of FIG. 3.

Figure 3:
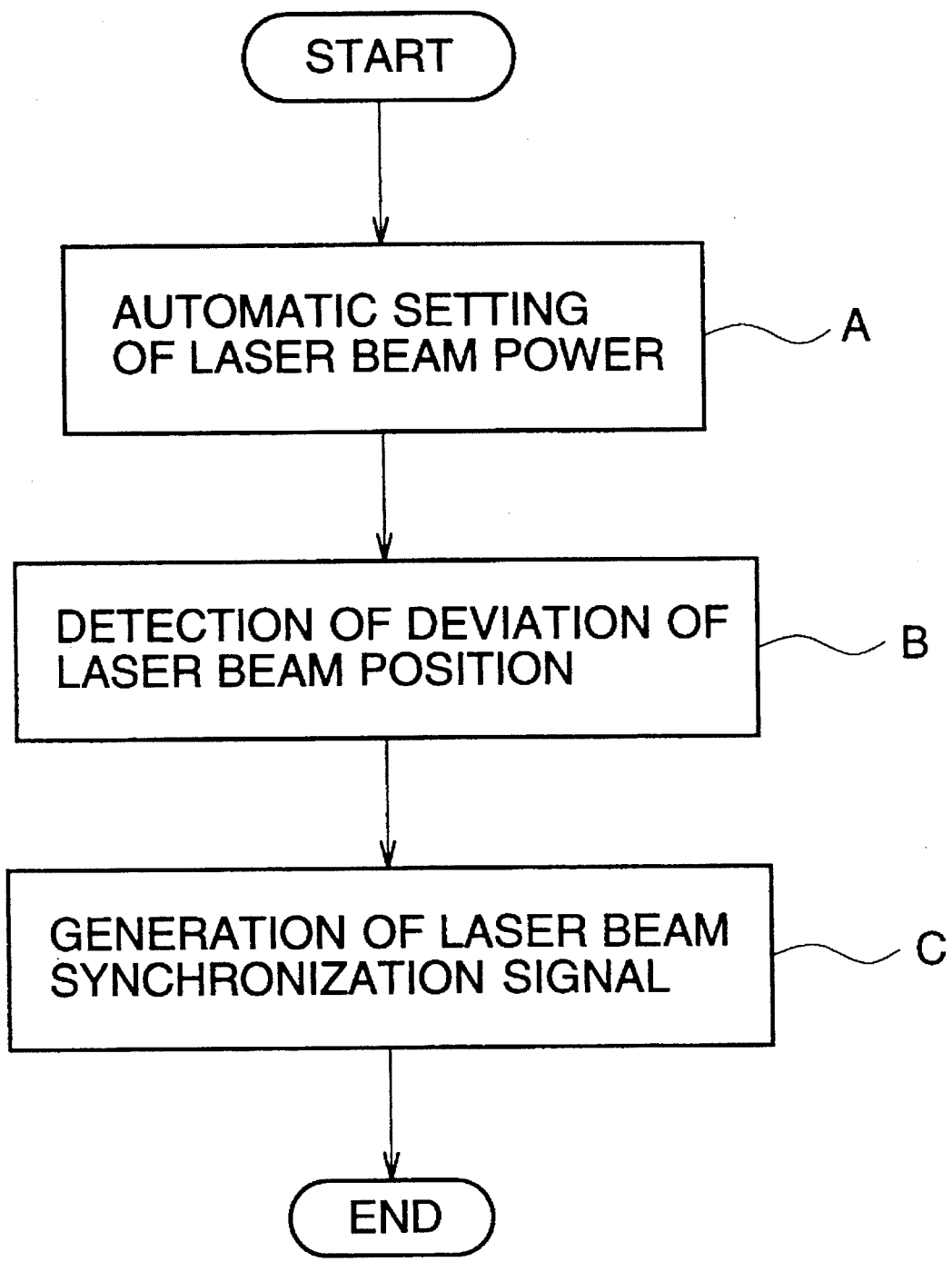
FIG. 3 is a flow chart showing an essential control step of the example.

In step A (beam power adjusting means) in the flow chart shown in FIG. 3, the beam power of the laser beams L1, L2 is automatically set so that the optical output (laser power) of each semiconductor laser 31a, 31b is adjusted to a predetermined value.

Next, in step B (deviation detecting means), the positional deviations of the laser beams L1, L2 in the scanning direction are detected by the index sensor 36. In the next step C (synchronization signal generating means), the index signals S1, S2, the generating interval of which corresponds to the positional deviation, are generated in accordance with the detected deviation.

That is, in this example, immediately before the positional deviations of the two laser beams L1, L2 in the scanning direction are detected, the optical output of each semiconductor laser 31a, 31b is adjusted to a predetermined value.

When the optical output of each semiconductor laser 31a, 31b is not appropriately adjusted, the diameter of each laser beam L1, L2 varies. Therefore, the time at which the laser beams L1, L2 are incident upon the index sensor 36 in accordance with scanning deviates irrespective of the interval of beam centers. Accordingly, it becomes impossible to accurately detect the deviations (interval of beam centers) of the two laser beams L1, L2.

In order to solve the above problems, in this example, the operation is made as follows. Before the detection of the deviation, the optical output of each laser beam L1, L2 is adjusted so that the beam diameters are made to be the same. In this way, erroneous detection of the scanning position caused by the deviation of the beam diameter can be avoided.

Consequently, even when each semiconductor laser 31a, 31b is affected by the environmental temperature, the optical output is automatically set and fixed at a predetermined value. Therefore, the beam diameter does not fluctuate, and the deviation of the two laser beams L1, L2 can be detected with high accuracy. Due to the foregoing, each index signal S1, S2 can be generated with high accuracy. As a result, when scanning is simultaneously conducted by the two laser beams L1, L2, an image of high fidelity can be formed.

Next, a specific example of the optical output (beam power) adjustment made in step A will be explained below.

Figure 4:
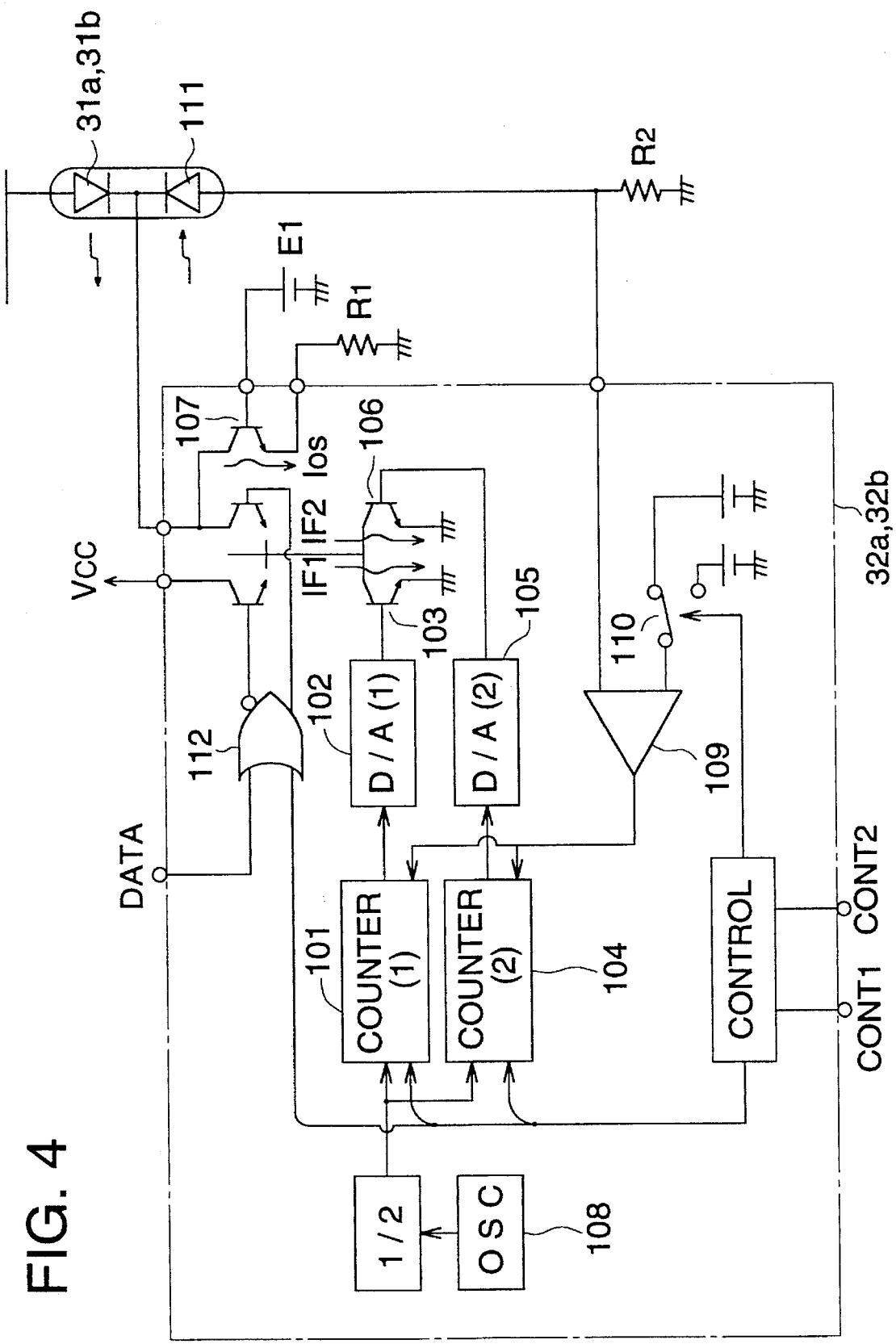
FIG. 4 is a circuit diagram showing the power beam adjusting circuit of the example.

A block diagram in FIG. 4 shows an outline of the laser drive circuits (laser drive ICs) 32a, 32b. Each laser drive circuit 32a, 32b includes: a first control system composed of a counter (1) 101, D/A converter (1) 102 and transistor 103; and a second control system composed of a counter (2) 104, D/A converter (2) 105 and transistor 106. Drive current IF1 determined by the first control system, drive current IF2 determined by the second control system, and total drive current $IF_{op}$ ($=I_{os}+IF1+IF2$) including base current $I_{os}$ are fed to each semiconductor laser 31a, 31b.

The base current $I_{os}$ is a constant current determined by the power supply E1, transistor 107 and resistance R1.

In this case, beam power is automatically set as follows using the first and second control systems, so that the drive current $IF_{op}$ can be made to be a value corresponding to the targeted optical output.

The counters (1) 101 and (2) 104 conduct the count-up or count-down operation on the output of the oscillator 108. Drive currents IF1 and IF2 are increased when the count-up operation is conducted. The count-up and count-down operation is controlled by a signal sent from the comparator 109. When the output of the comparator 109 is high, the count-up operation is conducted, and when the output of the comparator 109 is low, the count-down operation is conducted.

A reference voltage is selectively inputted through the switch 110, wherein the reference voltage is changed over when the drive current is determined to be either IF1 or IF2. A monitor current corresponding to the optical output detected by the light receiving element 111 is inputted as a light emitting voltage through the resistance R2.

First, the drive current IF2 in the first control system is adjusted so that the actual optical output (light emitting voltage) coincides with a predetermined target (reference voltage) under the condition that the second control system is reset. Next, under the condition that the drive current IF1 is fixed, the drive current IF2 is adjusted so that the optical output (light emitting voltage) coincides with the final target value (final target voltage).

As described above, When the drive current flowing in each semiconductor laser 31a, 31b is adjusted in accordance with the monitor current outputted according to the result of detection of the actual optical output, the optical output is adjusted. Due to the foregoing, the optical output can be simply and accurately adjusted so that the beam diameter is maintained to be constant.

In FIG. 4, by the control signals CONT1 and CONT2 inputted from the outside, either the drive current IF1 or IF2 in the second control system can be selectively determined. ON-OFF control of the semiconductor lasers 31a, 31b is conducted in accordance with image data through the OR circuit 112.

With reference to the flow chart shown in FIG. 5 and the time chart shown in FIG. 6, a specific example of the detection of beam deviation and the control of generation of index signals S1, S2 (synchronization signals) will be explained as follows, wherein the detection and control are conducted by the circuit shown in FIG. 4 when the optical output is adjusted and the beam diameter of each laser beam L1, L2 is made to be the same.

Figure 5:
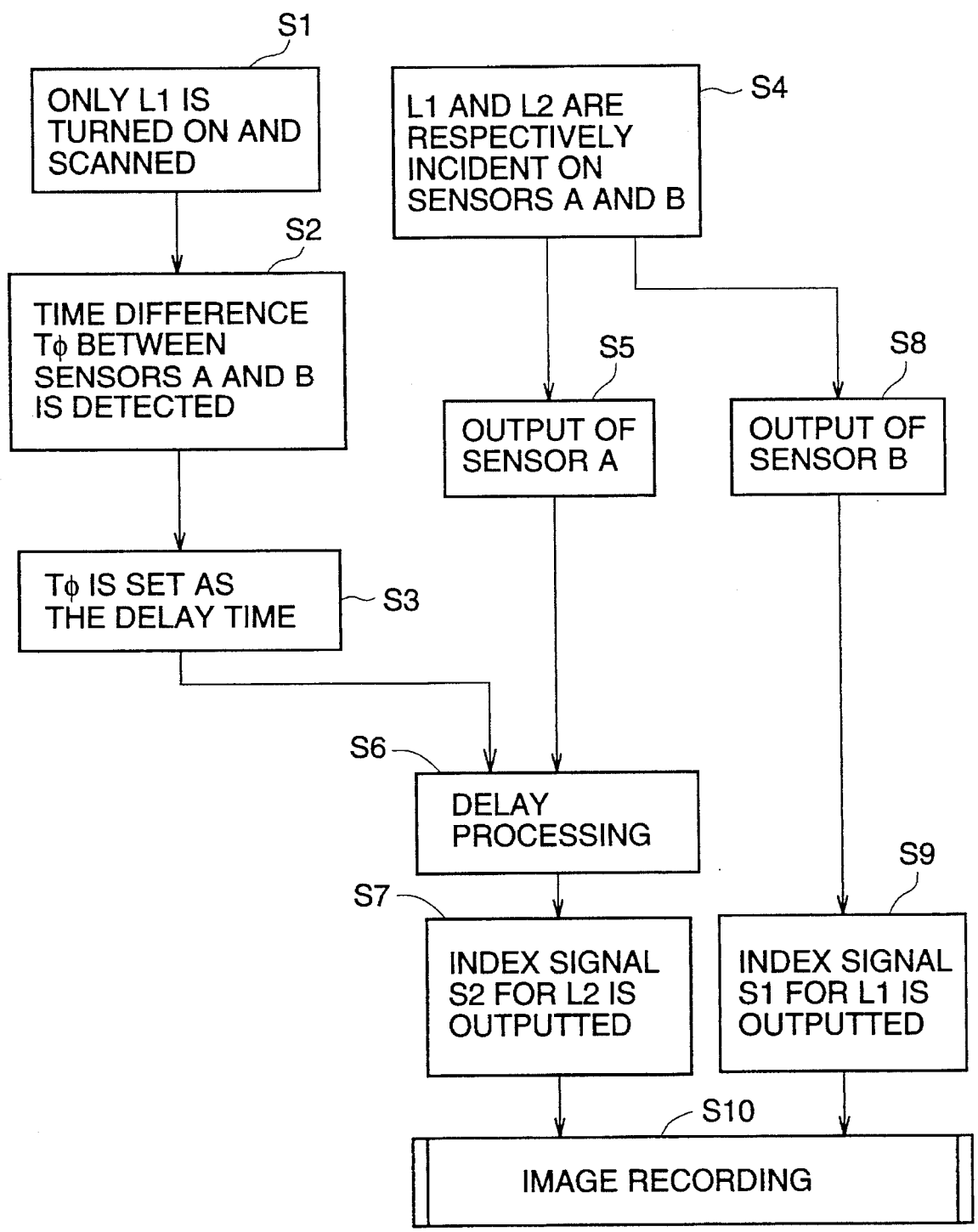
FIG. 5 is a flow chart showing the first example of beam deviation detection and synchronization signal generation control.

In this example, as illustrated in the flow chart of FIG. 5, the index signal generating circuit 37 functions as the deviation detecting means and the synchronization signal generating means.

Figure 7:
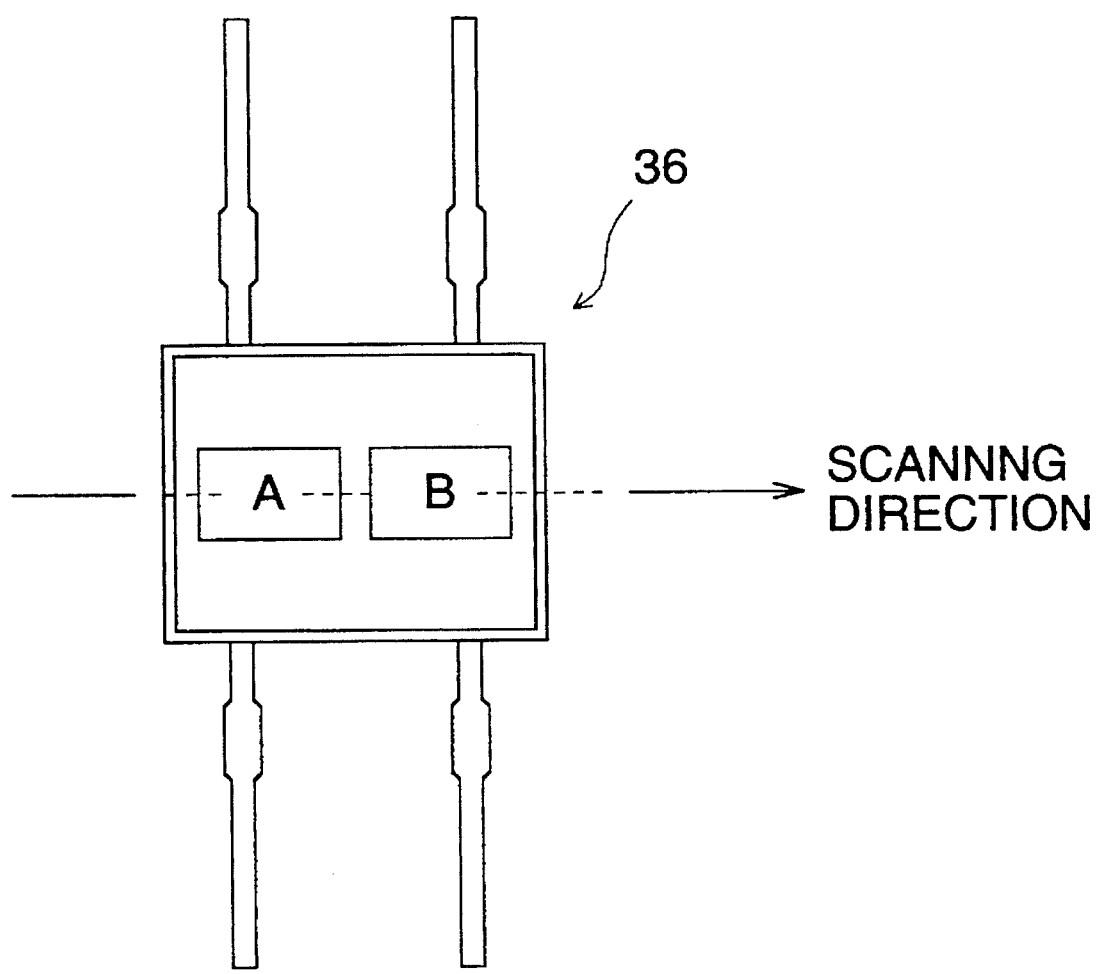
FIG. 7 is a schematic illustration showing the construction of the index sensor used in the example.

In this example, for the purpose of detecting the beam deviation, the index sensor 36 is constructed as follows. As illustrated in FIG. 7, the index sensor 36 includes two light receiving sections A and B. Each of the light receiving sections A and B is a sensor for outputting a light beam detection signal. The light receiving sections A and B are arranged in parallel with the scanning direction of the laser beams L1, L2. Two laser beams L1 and L2 are respectively incident upon the light receiving sections A and B. The light receiving section A of the index sensor 36 will be referred to as sensor A, and the light receiving section B of the index sensor 36 will be referred to as sensor B, hereinafter. Therefore, the index sensor 36 includes two beam detecting means corresponding to the number of beams.

In the flow chart shown in FIG. 5 indicating the first embodiment, operation is carried out as follows. When images are not recorded, only one laser beam is turned on, and scanning is conducted in the same manner as that of normal image recording operation, and the laser beam L1 is incident upon each of the sensors A and B of the index sensor 36. (ST1)

Then, time Tφ is measured, wherein time Tφ is defined as a period of time from the time (rising of the detection signal of the sensor A) at which the laser beam L1 is detected by the sensor A arranged on the scanning start side, to the time (rising of the detection signal of the sensor B) at which the laser beam L1 is detected by the sensor B arranged on the scanning end side. (ST2 shown in FIG. 6)

Time T$\phi$ described above is a value corresponding to an interval between sensors A and B under the condition of a predetermined scanning speed. When only the laser beam L2 is turned on instead of the laser beam L1, the same time T$\phi$ can be measured.

Next, in order to actually generate the index signals S1, S2 so as to form an image, the two semiconductor lasers 31a, 31b are controlled so that only the laser beam L1 is incident upon the sensor A and only the laser beam L2 is incident upon the sensor B. (ST4)

Specifically, at the start of scanning, only the laser beam L1 is turned on and scanned. When the laser beam L1 is detected by the sensor A, the laser beam L1 is immediately turned off. Instead of that, the laser beam L2 is turned on and scanned, and the laser beam L2 is detected by the sensor B. After the beam has been detected by the sensor B, both laser beams L1 and L2 are maintained in a condition in which laser beams L1 and L2 can be turned on. In this way, the apparatus is prepared for image recording (shown in FIG. 6).

As described above, when the laser beam L1 is detected by the sensor A, the laser beam L1 is immediately turned off, and instead of that, the laser beam L2 is turned on. In the construction described above, when the scanning point of the laser beam L2 is located at the sensor A, a detection signal of the laser beam L2 is outputted from the sensor A. In order to avoid the occurrence of that, it is preferable that the output of the sensor A is stopped after the sensor A has detected the laser beam L1, that is, masking is preferably made.

As described above, the sensor A detects the laser beam L1, and the sensor B detects the laser beam L2. On the assumption that the laser beams L1, L2 do not fluctuate in the scanning direction, it is considered that a period of time from the detection of the laser beam L1 by the sensor A to the detection of the laser beam L2 by the sensor B coincides with the time interval T$\phi$ described before. Deviations from the time interval T$\phi$ correspond to the deviations of the two laser beams L1, L2.

Figure 8:
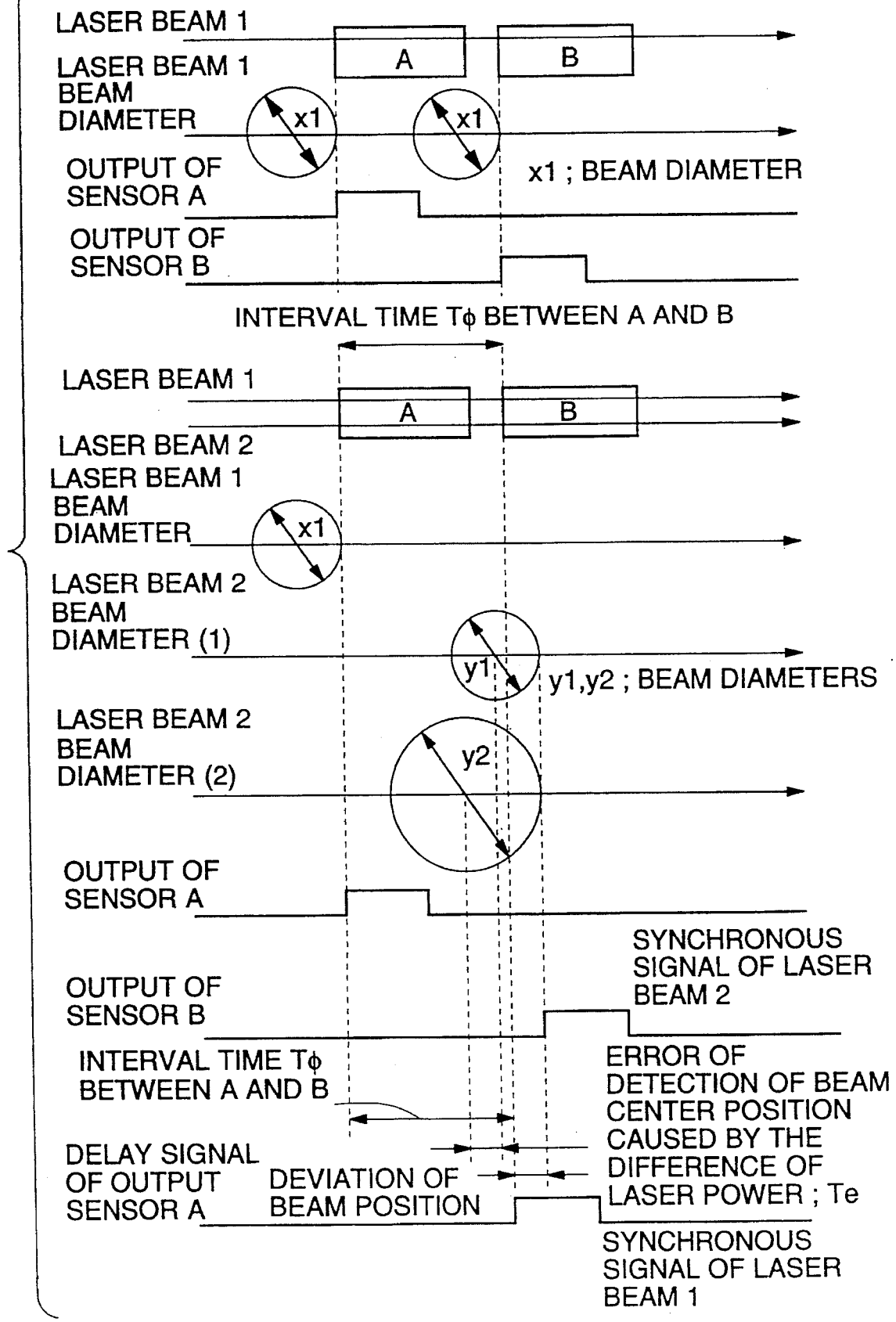
FIG. 8 is a time chart for explaining the circumstances of erroneous detection which has been made using a beam diameter when the scanning position deviates.

However, when the diameters of the laser beams L1, L2 are not the same in the detection of beam deviation, as illustrated in FIG. 8, the detection interval of the laser beams L1, L2 is affected and changed by the difference of the beam diameter as well as the deviation of the beam center. Therefore, it is impossible to generate the index signals S1, S2 of the laser beams L1, L2 with high accuracy.

As illustrated in FIG. 8, when the time T$\phi$ corresponding to a distance between the sensors A and B is measured only by the scanning of the laser beams L1, the sensors A and B detect a laser beam of the same diameter x1, so that the measurement of the time T$\phi$ is not affected by the beam diameter x1.

When the laser beam L1 is detected by the sensor A and the laser beam L2 is detected by the sensor B, and when the diameter y1 of the laser beam L2 is the same as the diameter x1 of the laser beam L1, the detection time of the laser beam L2 detected by the sensor B is in a correlation with the deviation of the beam centers of the laser beams L1 and L2.

However, for example, when the diameter y2 of the laser beam L2 is larger than the diameter x1 of the laser beam L1, the detection time of the laser beam L2 by the sensor B is quickened. Therefore, an error Te is caused in the detection of the centers of the two laser beams L1, L2. Accordingly, the deviations of the two laser beams L1, L2 in the scanning direction are erroneously detected.

However, in this example, immediately before the detection of beam deviation, the optical output (beam diameter) is adjusted. Therefore, the beam deviation is accurately detected in such a manner that the deviation of the beam center is detected.

In this case, a detection signal of the laser beam L1 by the sensor A is delayed by the time T$\phi$. A phase difference between this delayed detection signal and the detection signal of the laser beam L2 by the sensor B corresponds to the deviations of the laser beams L1, L2 in the scanning direction. In appearance, the detection signal becomes the same as a signal obtained when each of the laser beams L1, L2 is individually detected at the same position in the scanning direction.

The time T$\phi$ previously provided when only one laser beam L1 is turned on and scanned is set as a delay time of the detection signal of the sensor A (ST3). A detection signal of the sensor A is obtained when the laser beams L1, L2 are individually detected by the sensors A, B when they are selectively turned on at the fore end of scanning (ST5). This detection signal of the sensor A is delayed in accordance with the delay time T$\phi$ (ST6) and is used as a reference signal.

Figure 6:
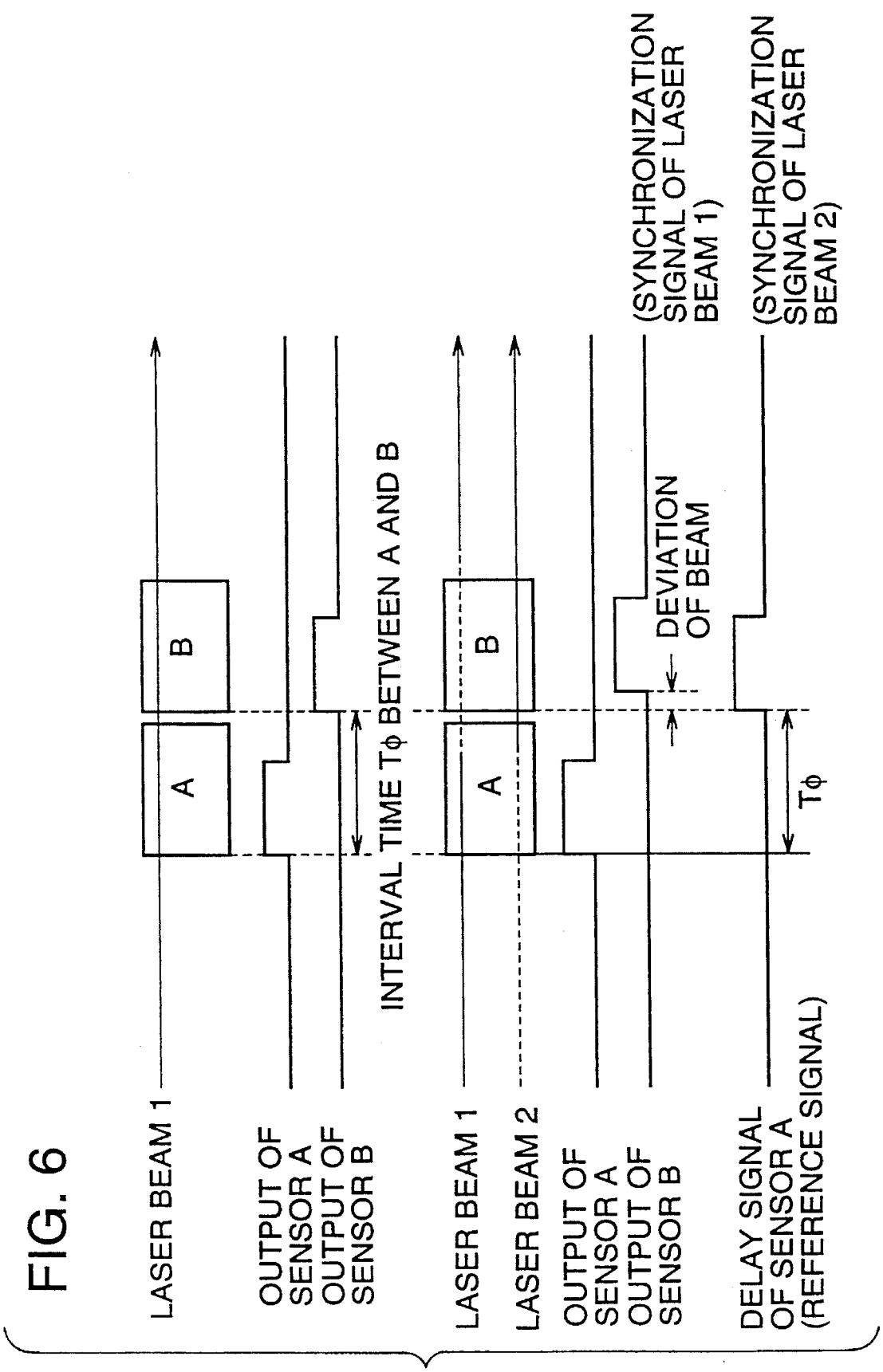
FIG. 6 is a time chart showing the signal characteristics of the first example.

As illustrated in FIG. 6, when the detection signal (ST8) of the laser beam L2 detected by the sensor B is generated being delayed with respect to this reference signal, the laser beam L2 is delayed later than the laser beam L1. Therefore, the reference signal is used as the index signal (synchronization signal) S2 of the laser beam L2, so that the laser beam L2 can be advanced (ST7), and the detection signal of the laser beam L2 detected by the sensor B is used as the index signal (synchronization signal) S1 (ST9) of the laser beam L1, so that the laser beam L1 is delayed. In this way, the phase difference is canceled and the deviation between the beams can be corrected.

In accordance with the index signals S1, S2, recording by the laser beams L1, L2 is started, so that actual image recording is carried out (ST10).

When the index signals S1, S2 of the laser beams L1, L2 are generated in the manner described above, even if the deviations of the laser beams L1, L2 are not constant, the index signals S1, S2 highly accurately corresponding to the deviations can be generated. Therefore, an accurate recording start command can be given in accordance with the index signals S1, S2.

When the optical output is adjusted immediately before the detection of beam deviation, the influence of beam deviation is avoided and occurrence of the error of the generation time of the index signals S1, S2 can be avoided.

Deviation of the beam in the scanning direction is detected by measuring a time interval of beam detection. Accordingly, it is sufficient that the beam is detected in the manner of ON and OFF detection, and beam detection of high resolving power is not required. Further, when the time T$\phi$ used as a reference of deviation detection is measure each time, it is possible to make an accurate detection even if the scanning speeds of the laser beams L1, L2 are changed.

Since the index signals S1, S2, the generation interval of which corresponds to the deviation, is provided without calculating the time corresponding to the deviation, synchronization signal generating control can be simplified.

In the example shown in FIG. 6, the deviation is caused when the laser beam L1 takes the lead in scanning. Even when the relation is reversed, the same effect can be provided. In this case, the reference signal is used as the index signal (synchronization signal) S2 of the laser beam L2, so that the laser beam L2 can be delayed, and the detection signal of the laser beam L2 detected by the sensor B is used as the index signal (synchronization signal) S1 of the laser beam L1, so that the laser beam L1 is advanced. In this way, the phase difference is canceled and the deviation between the beams can be corrected.

In the above example, an image forming apparatus in which two laser beams L1, L2 are utilized is shown. However, it should be noted that the present invention can be applied to an image forming apparatus in which not less than three laser beams simultaneously conduct scanning.

For example, when three laser beams L1, L2, L3 are used, three light receiving sections A, B, C aligned in the scanning direction are prepared as the index sensor 39. First, only one of the laser beams is turned on and scanned, so that the time intervals T$\phi$1 and T$\phi$2 of the sensors A, B, C are detected.

Next, the laser beam L1 is selectively incident upon the sensor A, the laser beam L2 is selectively incident upon the sensor B, and the laser beam L3 is selectively incident upon the sensor C. In this way, detection signals are obtained from the sensors A, B and C.

At this time, the detection signal of the laser beam L1 detected by the sensor A is delayed by T$\phi$1 or T$\phi$2, so that the delayed signal is used as the reference signal. Then, the timed relation between this reference signal and the signal provided when the detection signal of the laser beam L2 detected by the sensor B is delayed by T$\phi$2 is checked, and the timed relation between this reference signal and the detection signal of the laser beam L3 detected by the sensor C is also checked, and then the respective synchronization signals are determined so that the phase differences among the laser beams L1, L2 and L3 can be canceled. In this way, the deviation between the beams can be corrected.

After the time interval of the sensors has been obtained by the lighting and scanning of the same laser beam, the laser beam is individually incident upon each sensor so that the detection signal is outputted. Then the detection signal of the sensor on the start side is delayed by the time interval of the sensor so that the time can be made to coincide with the time of the sensor on the end side.

Figure 9:
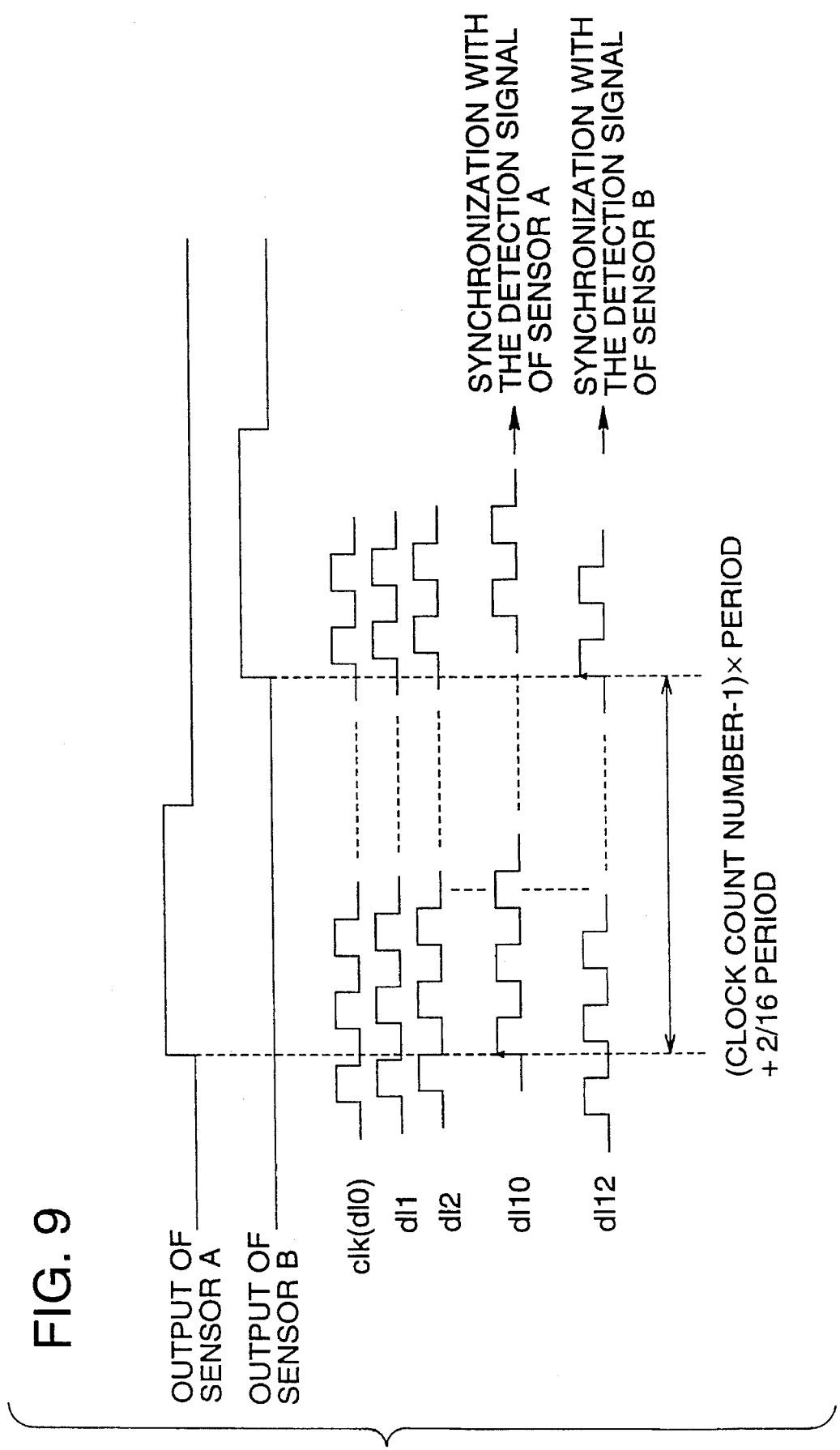
FIG. 9 is a time chart showing the measuring method by which an interval of generation of the beam detection signal is measured.

In this case, a difference of the output time of the detection signals sent from the sensors A, B is measured in the manner illustrated in FIG. 9.

In FIG. 9, dl0 is a reference clock clk. Clocks dl1 to dl15 having a phase difference of 1/16 period of this reference clock clk are generated. In FIG. 9, only the clocks dl0, dl1, dl2, dl10 and dl12 are shown, and other clocks are omitted in the drawing.

For example, when a clock synchronized with the rise of the detection signal of the sensor A is the clock dl10, the rise of this clock dl10 is successively counted.

When the detection signal of the sensor B rises in this process of counting and a clock synchronized with this rise of the detection signal is the clock dl12, a difference of output time of the sensors A, B is found as follows:
A value obtained when 1 is subtracted from the counted number of the rise of the clock dl10, is multiplied by the clock period. The thus obtained value is added by a difference of the phase between the clocks dl10 and dl12. The thus obtained value is the difference of output time between the sensors A and B.

Figure 10:
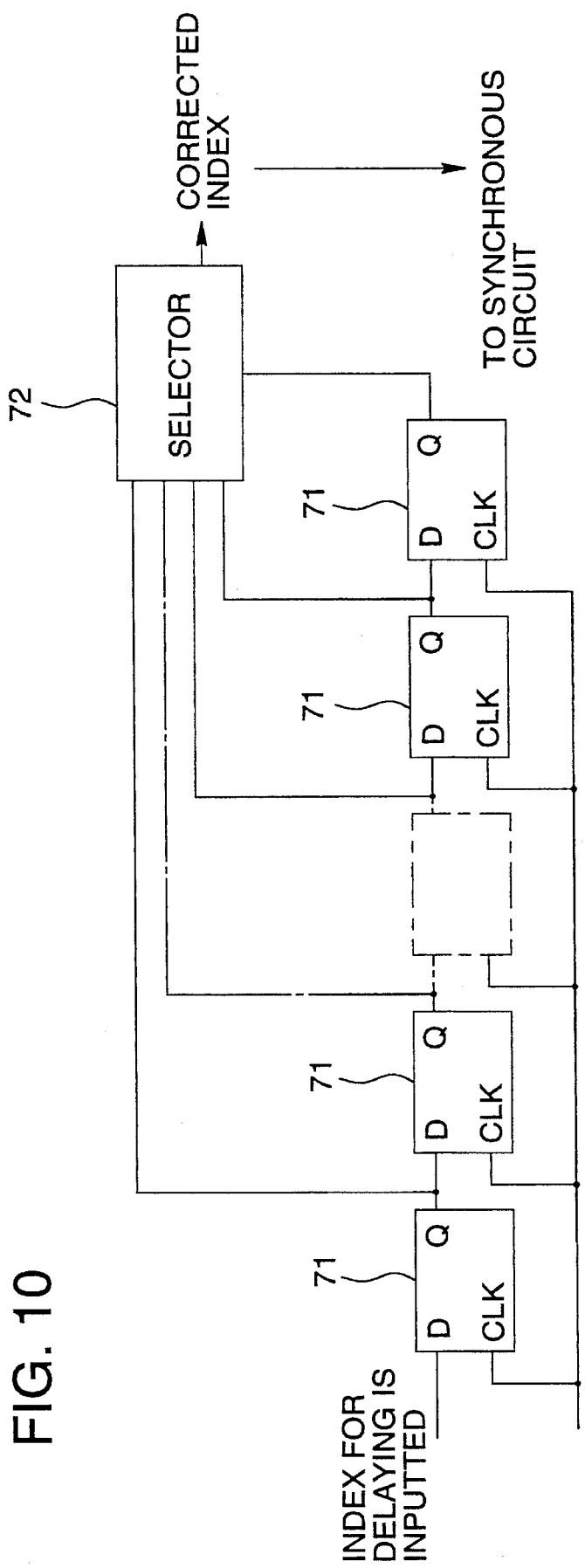
FIG. 10 is a block diagram showing the delay processing circuit of the beam detection signal.

When the time is measured in the manner described above, a detection signal of the sensor can be delayed according to the result of the measurement, using the circuit structure shown in FIG. 10.

In FIG. 10, a plurality of shift registers 71 are connected in series. The aforementioned clocks dl0 to dl15 are selectively given to the shift registers 71. A plurality of deviation outputs outputted from the shift registers 71 are sent to the selector 72. One of the deviation outputs is selectively outputted from the selector 72 as a delayed signal.

For example, as shown in FIG. 10, when the rise of the detection signal of the sensor A is synchronized with the clock dl10 and the rise of the detection signal of the sensor B is synchronized with the clock dl12, and when the detection signal of the sensor A is delayed by the measured time, the clock dl12 is given to each shift register 71 as a clock signal. In other words, when the clock dl12 is given to each shift register 71, a fraction that can not be expressed by the clock period is delayed so that the shift register 71 is operated.

Concerning the output of each shift register 71, the following signal may be selected by the selector 72 and outputted. It is a signal on which a deviating operation is conducted in accordance with the count number obtained when 1 is subtracted from the count number of the clock dl10. For example, when the count number of the clock is 3, an output of the second shift register that is delayed by 2 periods may be selected by the selector 72.

In the above example, when delay processing of the sensor time interval T$\phi$ is carried out, the index signals S1, S2 are obtained which have a phase difference corresponding to the deviations of the laser beams L1, L2 in the scanning direction. However, the deviation time of the laser beams L1, L2 in the scanning direction may be actually calculated, and the detection signal may be delayed in accordance with this deviation time so that the index signals S1, S2 can be provided corresponding to the laser beams L1, L2.

Figure 11:
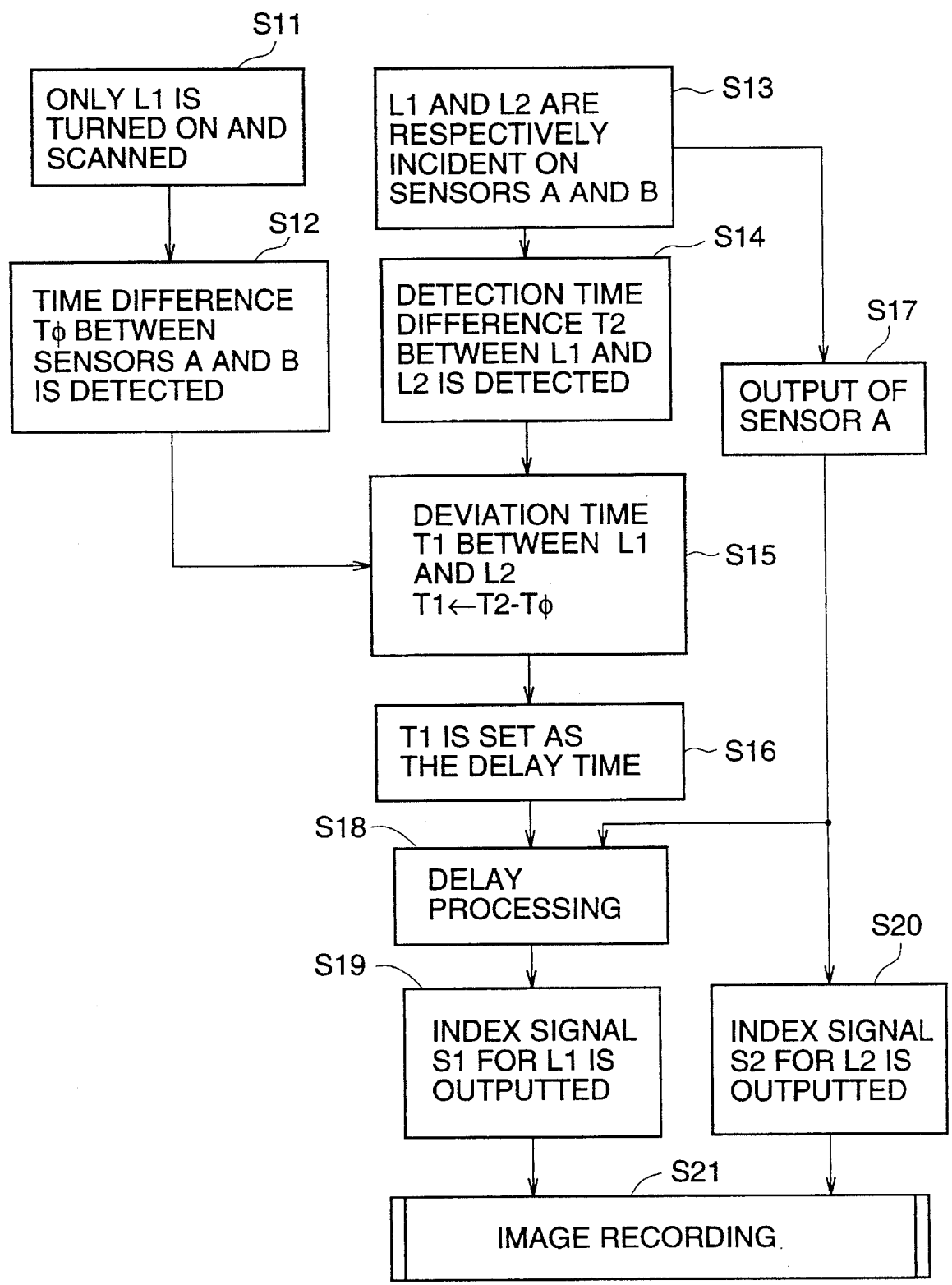
FIG. 11 is a flow chart showing the second example of beam deviation detection and synchronization signal generation control.
Figure 12:
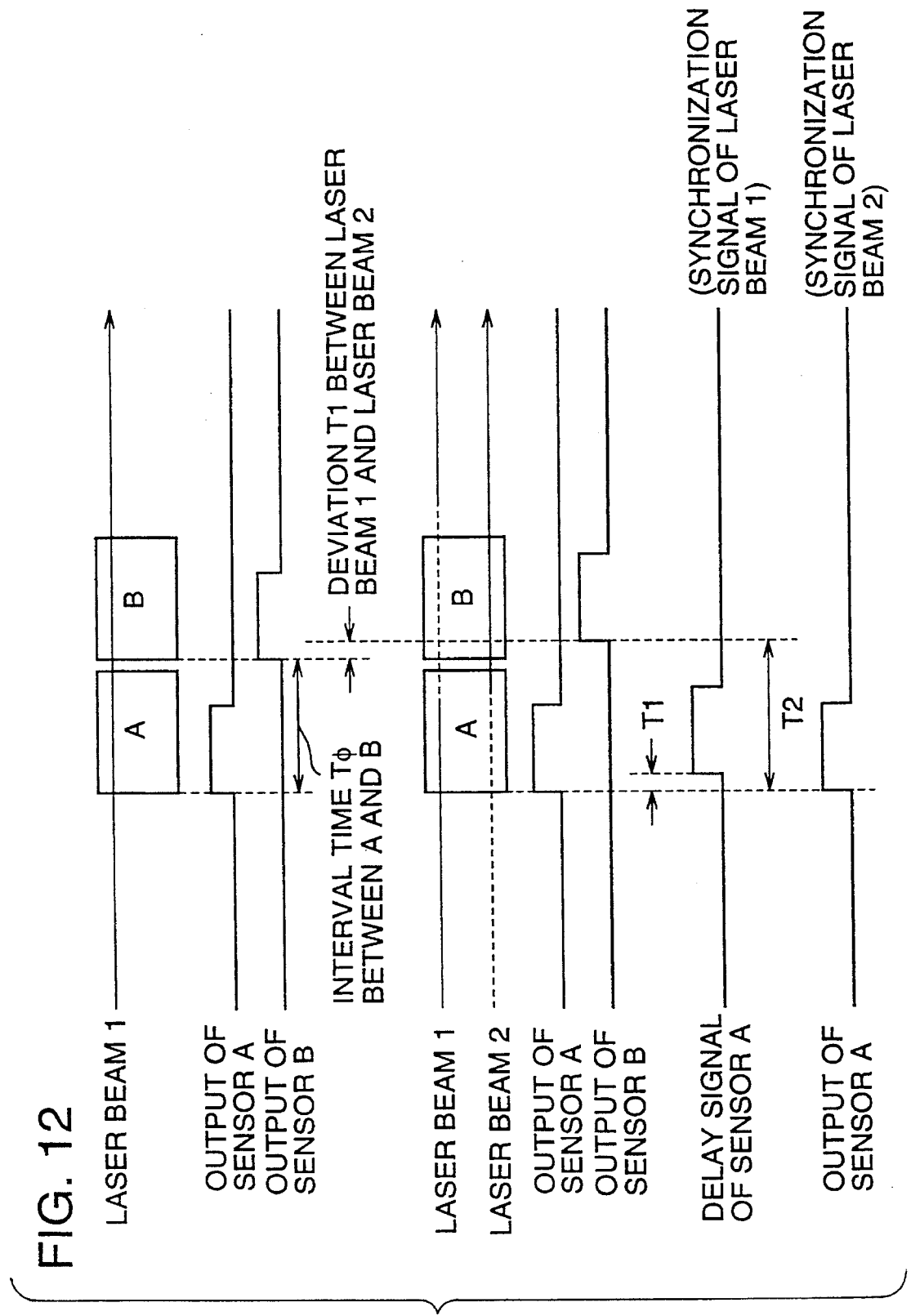
FIG. 12 is a time chart showing the signal characteristics in the second example.

With reference to the flow chart shown in FIG. 11 and the time chart shown in FIG. 12, the second example will be explained as follows. Even when the procedure of deviation detection is different, the optical output (beam diameter) is adjusted immediately before the detection of beam deviation in the same manner.

In the same manner as the example described before, when only the laser beam L1 is turned on and scanned, the time interval T$\phi$ between the sensors A and B is measured (ST11, ST12).

Next, the laser beams L1 and L2 are selectively incident upon the sensors A and B, so that a detection signal of the laser beam L1 is provided by the sensor A, and a detection signal of the laser beam L2 is provided by the sensor B (ST13). Then, a generation time difference T2 between the detection signals is measured (ST14).

In this case, when there is no deviation in the scanning direction between the laser beams L1 and L2, it is considered that T$\phi$ is the same as T2. The difference T1 (T2−T$\phi$) corresponds to the deviation between the laser beams L1 and L2 in the scanning direction. In the case shown in FIG. 12, scanning is conducted being delayed onto the laser beam L2 side (ST15).

Then, the detection signal (ST17) detected by the sensor A is use as the index signal (synchronization signal) S2 of the delayed laser beam L2, so that the laser beam L2 is advanced (ST20), and the signal (ST16, ST18) provided when the detection signal detected by the sensor A is delayed by the deviation time T1 is used as the index signal (synchronization signal) S1 (ST19), so that the laser beam L1 is delayed. In this way, the phase difference can be canceled and the deviation between the beams can be corrected.

The laser beam L2 is scanned being delayed by the time T1 compared with the laser beam L1, and a detection signal of the sensor A is outputted in accordance with the laser beam L2. Accordingly, when this detection signal of the sensor A is delayed by the time T1, this delayed signal is outputted corresponding to the scanning position of the laser beam L1.

The record start position is controlled by the index signals S1, S2, and images are recorded by the laser beams L1, L2 (ST21).

In the above example, the deviations of the laser beams L1, L2 are actually found, and delay processing is conducted in accordance with the deviations, so that the index signals S1, S2 are generated corresponding to the laser beams L1, L2. Accordingly, even when the aforementioned deviations are not constant, highly accurate index signals S1, S2 can be provided. Further, optical output is adjusted immediately before the detection of beam deviation, so that variation of the optical output is reduced, and the generation time of the index signals S1, S2 can be accurately controlled.

When the laser beam L2 takes the lead and conducts scanning while the laser beam L1 conducts scanning being delayed, and when the device is composed in such a manner that the laser beam L1 is incident upon the sensor A and the laser beam L2 is incident upon the sensor B, the value T1 is calculated to be a negative value. Therefore, it becomes impossible to generate the index signal S1 substantially corresponding to the laser beam L1 in accordance with the detection signal of the sensor A.

Therefore, in the case where the time T1 is calculated to be a negative value, a relation between the laser beams L1, L2 selectively incident upon the sensors A, B in S13 is reversed, so that a laser beam which takes the lead in the scanning is incident upon the sensor A. Alternatively, output of the sensor B is made to be a synchronization signal of the laser beam L2 while the output of the sensor B by the laser beam L2 is used as a reference, and a signal in which the output of the sensor B is delayed by T1 is made to be a synchronization signal of the laser beam L1.

In the above example, when the deviation time T1 is found, it is possible to generate a detection signal of the beam which takes the lead in the scanning operation, and it is also possible to generate an index signal for the beam which conducts scanning being delayed by the deviation time T1. Accordingly, it is not necessary that the beams are selectively detected with respect to the sensors A and B, so that the control operation to be carried out for recording can be simplified.

In the above example, deviation time is calculated with respect to the two laser beams L1 and L2 in the scanning direction. Information of this deviation time can be used for other controlling operations. For example, when the deviation time T1 is not less than a predetermined value, a warning for demanding maintenance may be given. Since the deviation time is provided, it is possible to generate a synchronization signal for each beam at the time of optical detection.

In the above construction in which the deviation time is actually calculated so that the delay processing is conducted, the number of the laser beams may be not less than 3.

For example, when three laser beams L1, L2, L3 are used, three light receiving sections A, B and C arranged in the scanning direction are prepared as the index sensor 39. Then only one of the laser beams is turned on and scanning is conducted, so that the time intervals $T\phi 1$ (between A and B) and $T\phi 2$ (between B and C) are detected.

Then the laser beam L1 is selectively incident upon the sensor A, the laser beam L2 is selectively incident upon the sensor B, and the laser beam L3 is selectively incident upon the sensor C. Then a detection signal is obtained from each sensor A, B, C. At this time, the detection signal intervals T2-1 (between A and B) and T2-2 (between B and C) are measured.

As the deviation of T2-1 and $T\phi 1$, the delay time T1L2 of the laser beam L2 with respect to the laser beam L1 is calculated, and as the deviation of T2-2 and $T\phi 2$, the delay time T1L3 of the laser beam L3 with respect to the laser beam L2 is calculated.

In this case, the detection signal detected by the sensor A is used as the index signal (synchronization signal) of the most delayed laser beam, so that the most delayed laser beam can be advanced. Next, the delay time T1L1 and the delay time T1L3 are compared with each other to find which is longer, and the signal provided when the detection signal detected by the sensor A is delayed by the longer delayed time is used as the index signal (synchronization signal) S1 of the laser beam L1, so that the laser beam L1 is delayed, and the signal provided when the detection signal detected by the sensor A is delayed by the shorter delayed time is used as the index signal which has been intermediately delayed. In this way, the phase difference is canceled and the deviation between the beams can be corrected.

Also when not less than 3 laser beams are used, it is necessary that the laser beam incident upon the sensor A at the scanning start point is a laser beam which takes the lead in the scanning, however, concerning the laser beam incident upon the sensor B and after that, the order is not necessarily limited to the scanning order.

When the actual deviation time is calculated and the detection signal is subjected to delay processing as described above, the delay processing can be carried out by the circuit shown in FIG. 10.

For example, the delay processing is carried out under the following condition:

When one laser beam is used so as to find the time interval $T\phi$ between the sensors A and B, as illustrated in FIG. 9, each of the clocks dl10 and dl12 is synchronized with each detection signal, and further the count number of the clock (period) is 10. On the other hand, when the laser beams L1 and L2 are respectively incident upon the sensors A and B, as illustrated in FIG. 13, each of the clocks dl10 and dl14 is synchronized with each detection signal, and further the count number of the clocks is 12.

Figure 13:
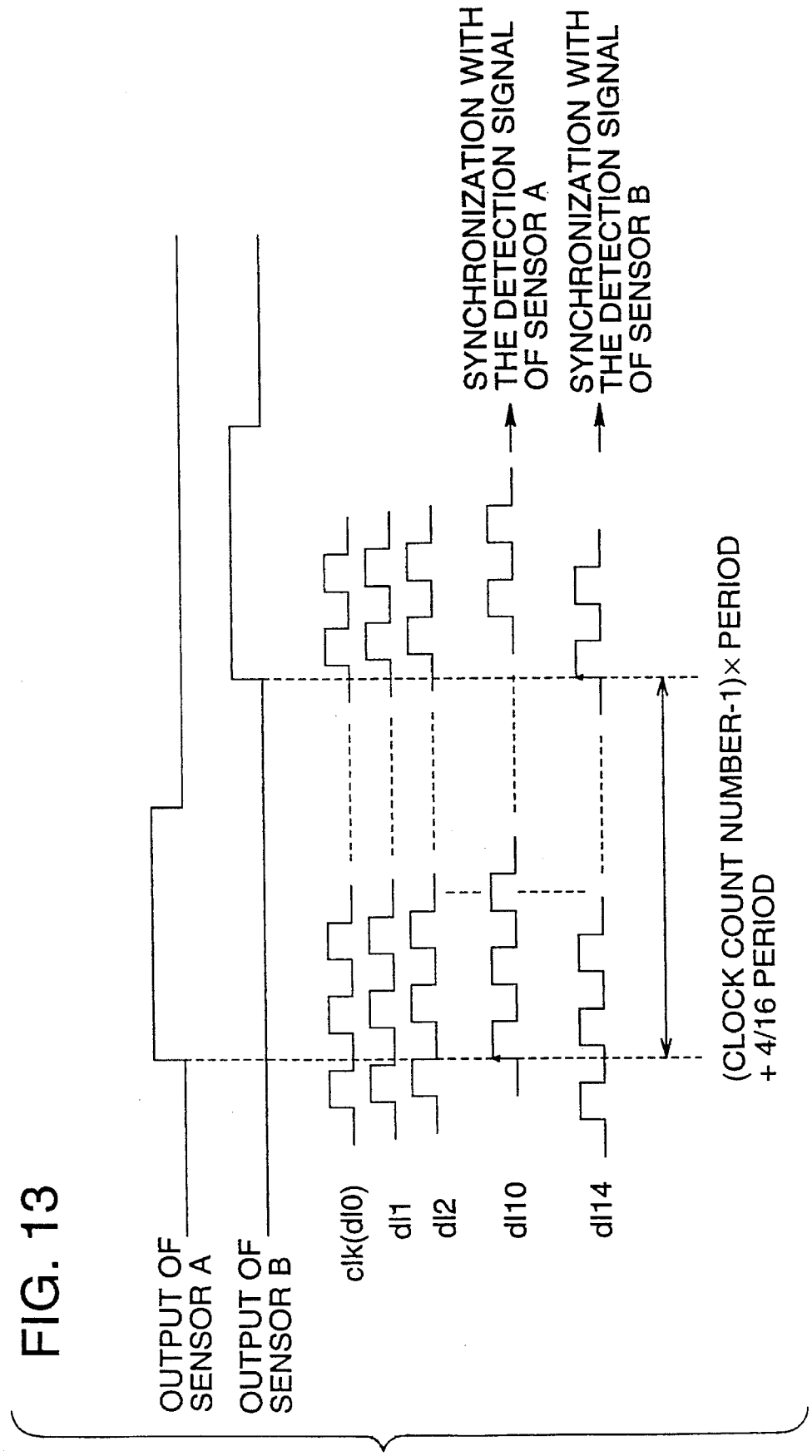
FIG. 13 is a time chart showing the measuring method by which a time interval of the beam detection signal is measured.

In this case, the time measured in FIG. 9 is $(10+2/16)\times$ (period), and the time measured in FIG. 13 is $(12+4/16)\times$ (period). Therefore, a difference of the counted value of the clock (period) is 2, and a deviation of the fraction that can not be expressed by the counted number of the clock is $2/16$(period).

Accordingly, in the case where a detection signal of the sensor A is delayed by the deviation between the time T2 measured by the characteristics shown in FIG. 13 and the time $T\phi$ measured by the characteristics shown in FIG. 9, a delay corresponding to $2/16$(period) is set when the clock dl10 delayed by 2 steps with respect to the clock dl10 with which the detection signal of the sensor A is synchronized is given to the shift register 71. A delay corresponding to 2 periods may be provided in such a manner that the output of the shift register 71 delayed by 2 periods is selected by the selector 72 and outputted.

In the above example, when the detection signals of the sensors A and B of the index sensor 36 are subjected to delay processing in the index signal generating circuit 37, the index signals S1 and S2 (synchronization signals) corresponding to the laser beams L1 and L2 are generated. However, the following construction may be adopted: Under the condition that only the laser beam L1 is incident upon the sensor A and only the laser beam L2 is incident upon the sensor B, the index signals S1 and S2 respectively synchronizing with the detection signals of the sensors A and B are generated. On the other hand, the data which is the same as the delay data of the detection signal in the example described before is given to the synchronization circuit 60, and the data clock (dot clock) DCK generated in the synchronization circuit 60 is subjected to a predetermined delay processing. In this way, the data clock DCK corresponding to the scanning position of each of the laser beams L1, L2 is generated.

According to the present invention for accomplishing the first object, the following effects can be provided.

As explained above, according to the synchronization signal generating unit of an image forming apparatus of the present invention, after the beam power has been adjusted to be equal, the deviation of the light beam in the scanning direction is detected. Therefore, the occurrence of erroneous detection caused by the deviation of the beam diameter can be avoided. Accordingly, the synchronization signal for each laser beam can be generated with high accuracy.

Further, beam power is adjusted when a current flowing in the semiconductor laser is controlled. Accordingly, the beam power, that is, the beam diameter can be adjusted simply and highly accurately.

Further, when the time of light beam detection is measured, the deviations of a plurality of light beams in the scanning direction are detected. Accordingly, it is sufficient that the light beam is detected in the ON-OFF manner, and it is not necessary to provide a sensor of high resolving power for detecting the deviation.

Further, in the first example, it is not necessary to finally calculate the deviation in the scanning direction. As a result, synchronization signals having the generation intervals corresponding to the deviations can be provided, so that the calculation can be simplified, and it is not necessary to discriminate the scanning order of light beams. Therefore, control can be simplified.

Further, in the second example, the deviation in the scanning direction can be found as the time. Therefore, after the time of the deviation has been detected, it is sufficient that only the detection signal of the light beam taking the lead in scanning is obtained. Accordingly, control can be simplified in the image recording process.

An example to accomplish the second object of the present invention having the construction shown in FIGS. 1 and 2 will be explained below.

Figure 14:
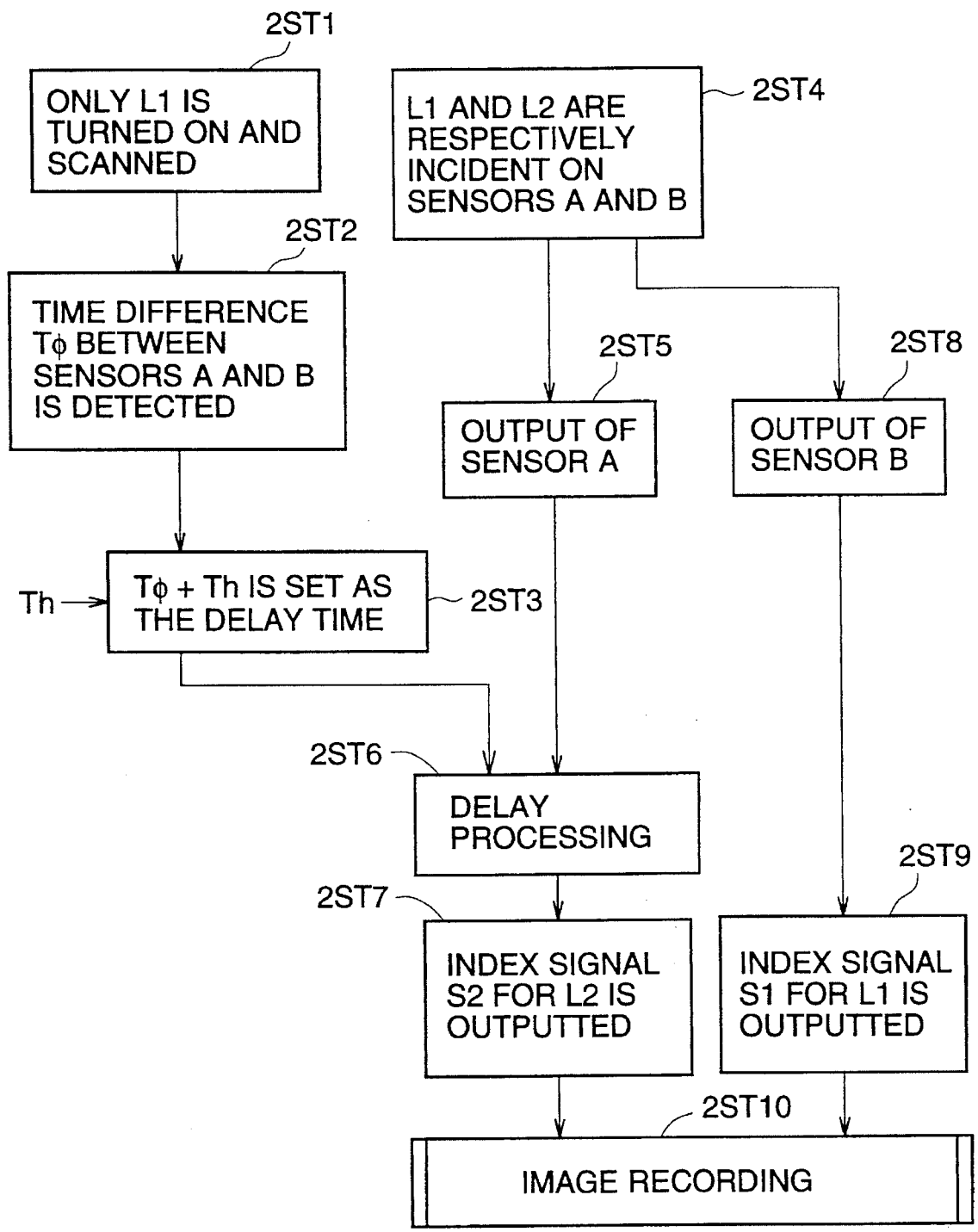
FIG. 14 is a flow chart showing the first example of synchronization signal generating control.

With reference to the procedure shown in the flow chart in FIG. 14 and the time chart in FIG. 15, generation control of the index signals S1 and S2 in the index signal generating circuit 37 will be explained as follows.

First, when the electric power supply is turned on or immediately before the image formation, only one L1 of the laser beams is turned on, and the scanning operation is carried out in the same manner as that of the normal image recording. In this way, only the same laser beam L1 is detected by the sensors A and B (a pair of light beam detecting means) of the index sensor 36 (2ST1).

Figure 15:
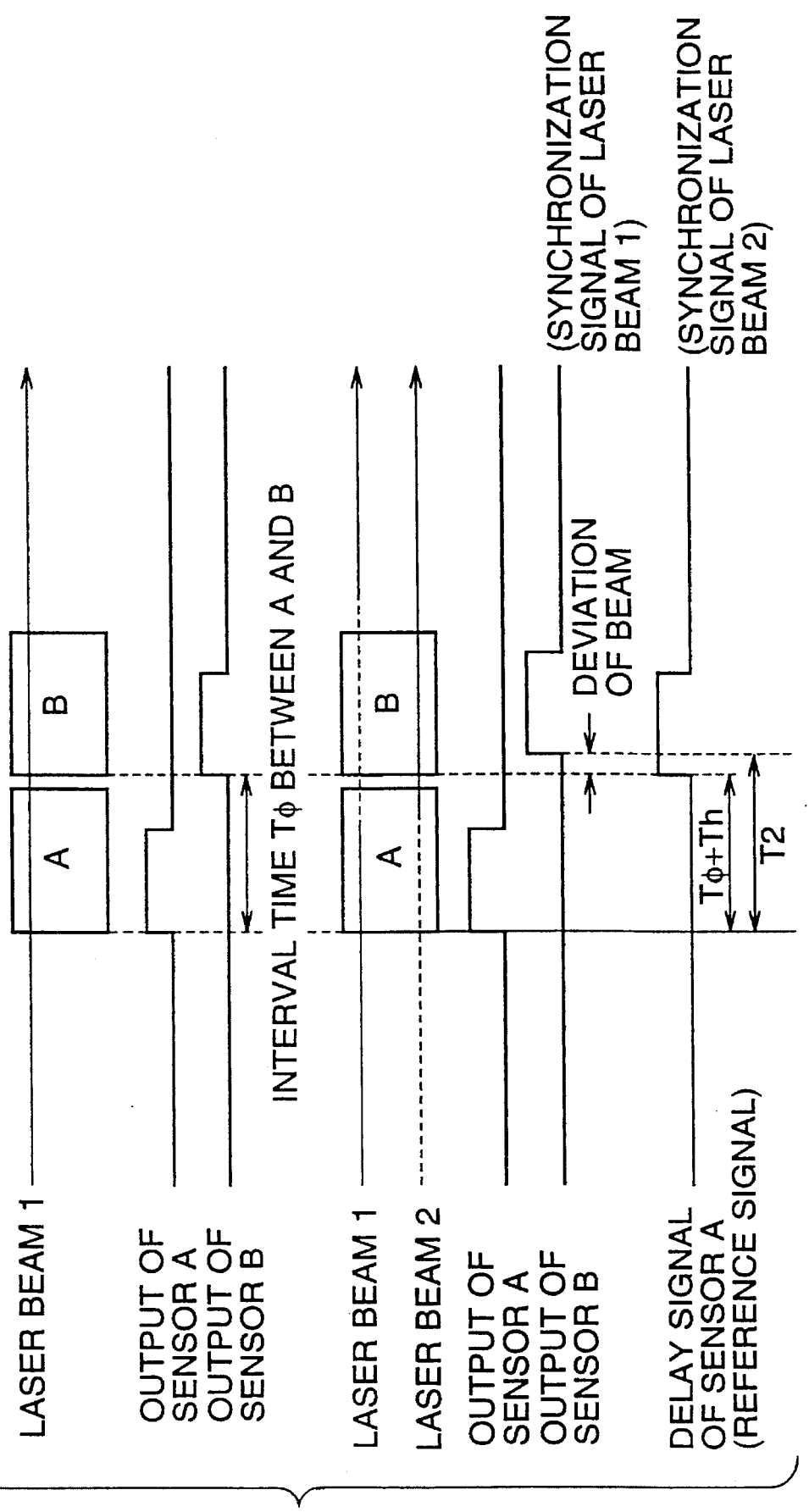
FIG. 15 is a time chart showing the characteristics of synchronization signal generating control in the first example.

In this case, the time interval Tφ is measured, which is from the time (the rise of the detection signal detected by the sensor A) at which the laser beam L1 is detected by the sensor A on the primary scanning start side, to the time (the rise of the detection signal detected by the sensor B) at which the laser beam L1 is detected by the sensor B on the primary scanning end side (2ST1: shown in FIG. 15).

The aforementioned time Tφ is a value corresponding to the interval between the sensors A and B under the condition of a predetermined scanning speed. Under the condition that the sensors A and B are not inclined, when only the laser beam L2 is turned on instead of the laser beam L1, the same value of time Tφ is measured.

Next, the index signals S1 and S2 are actually generated for image recording. In this case, two semiconductor lasers 31a, 31b are controlled to be turned on and off so that the laser beam L1 can be detected only by the sensor A and also the laser beam L2 can be detected only by the sensor B (2ST4).

Specifically, the operation is carried out as follows. First, only the laser beam L1 is turned on and subjected to scanning. When the laser beam L1 is detected by the sensor A, the laser beam L1 is immediately turned off. Instead of the laser beam L1, the laser beam L2 is turned on and subjected to scanning, and the laser beam L2 is detected by the sensor B. After the beam has been detected by the sensor B, both laser beams L1 and L2 are turned on in preparation for image recording (shown in FIG. 15).

As described above, in the above construction, when the laser beam L1 is detected by the sensor A, the laser beam L1 is immediately turned off, and instead of the laser beam L1, the laser beam L2 is turned on. In the above construction, when the scanning point is located at the sensor A when the laser beam L2 is turned on, a detection signal of the laser beam L2 is outputted from the sensor A. In order to prevent the occurrence of the above problem, it is preferable that the output of the sensor A is stopped, that is, masking is made after the laser beam L1 has been detected by the sensor A.

As described above, the laser beam L1 is detected by the sensor A, and the laser beam L2 is detected by the sensor B. On the assumption that there is no deviation of the scanning position between the laser beams L1 and L2 in the primary scanning direction, the time interval from the detecting time of the laser beam L1 by the sensor A to the detecting time of the laser beam L2 by the sensor B must coincide with the time Tφ described above. Deviations from the time Tφ correspond to the deviations of the scanning positions of the two laser beams L1, L2 in the primary scanning direction.

When a detecting signal generated when the laser beam L1 is detected by the sensor A is delayed by the time Tφ, a phase difference between the delayed detecting signal and a detecting signal (not to be delayed) generated when the laser beam L2 is detected by the sensor B corresponds to the deviation of the scanning position in the primary scanning direction of the laser beams L1, L2. Apparently, both detecting signals are the same as the signals obtained when the laser beams L1, L2 are individually detected at the same scanning position in the primary scanning direction.

Figure 16:
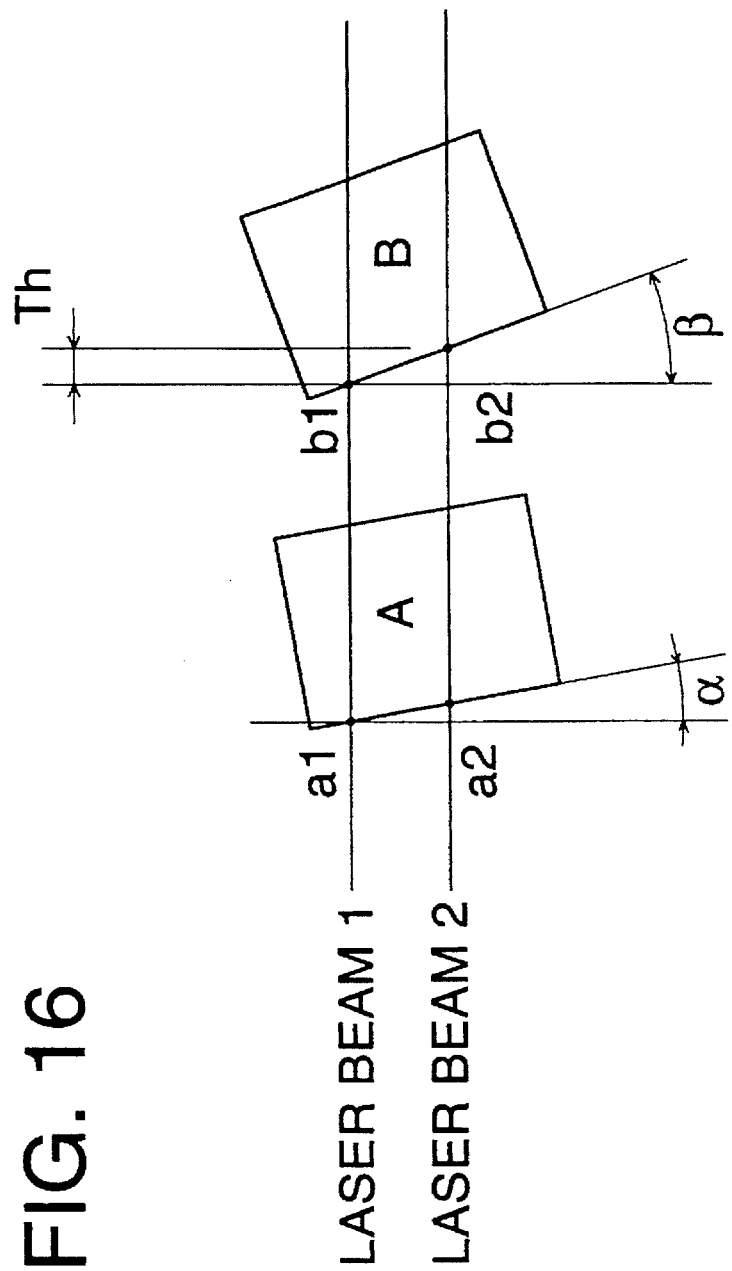
FIG. 16 is a plan view showing an example of the sensor inclination.

The above relation can be applied to a case in which the sensors A and B are not inclined. For example, when the sensors A and B are not parallel with the subsidiary scanning direction as illustrated in FIG. 16, that is, when the sensors A and B are inclined, the detection time of the laser beams L1 and that of the laser beam L2 are deviated due to the inclination. Therefore, it is not possible to make a signal highly accurately corresponding to the deviation of the scanning position in the primary scanning direction by the delay of the time Tφ.

In this example for accomplishing the second object of the present invention, an interval of the sensors A and B at the subsidiary scanning position of the laser beam L1 is made to be a reference, and further the laser beam L2 is detected only by the sensor B. Due to the foregoing construction, the deviation of the points a1 and a2 in the primary scanning direction shown in FIG. 16 does not cause a problem, but only the deviation of the points b1 and b2 in the primary scanning direction shown in FIG. 16 causes a problem.

Therefore, in this example, in order to correct the deviation of the detecting time caused by the inclination of the sensors A and B, the deviation time $T_h$ (the deviation of the time of detection between the light beams) is previously stored in a storing section which expresses the deviation between the points b1 and b2 in the primary scanning direction under the condition of the primary scanning direction.

For example, as illustrated in FIG. 16, when the point b2 is deviated with respect to the point b1 in the primary scanning direction, the time of detection of the laser beam L2 by the sensor B is delayed by the deviation time $T_h$ described before. Therefore, it is necessary to set the delay time in which the deviation time $T_h$ is added to the time $T\phi$. On the contrary, when the point b2 is deviated with respect to the point b1 to the start end side of the primary scanning, the time of detection of the laser beam L2 by the sensor B is quickened by the deviation time $T_h$. Therefore, it is necessary to set the delay time in which the deviation time $T_h$ is subtracted from the time $T\phi$. Accordingly, when the deviation time $T_h$ is previously found, in accordance with the relative positional relation between the points b1 and b2, the deviation time $T_h$ is stored as a positive value (a positional relation between the points b1 and b2 shown in FIG. 16) or stored as a negative value (a reverse positional relation of the points b1 and b2 shown in FIG. 16). When the deviation time $T_h$ is added to the time $T\phi$, the addition and subtraction can be carried out.

In this example, the deviation time $T_h$ is added to the time $T\phi$ previously obtained by lighting and scanning of only one laser beam L1. The thus obtained time is set to be the delay time $T_R(\leftarrow T\phi + T_h)$ of the detection signal of the sensor A (2ST3). The detection signal of the sensor A obtained when the laser beams L1, L2 are individually detected by the sensors A, B as described above (2ST5) is delayed by the delay time $T_R$ (2ST6) and is used as a reference signal.

As illustrated in FIG. 15, when the detection signal (2ST8) of the laser beam L2 detected by the sensor B is generated being delayed with respect to this reference signal, the laser beam L2 is delayed later than the laser beam L1. Therefore, the reference signal is used as the index signal (synchronization signal) S2 of the laser beam L2, so that the laser beam L2 can be advanced (2ST7), and the detection signal of the laser beam L2 detected by the sensor B is used as the index signal (synchronization signal) S1 (2ST9) of the laser beam L1, so that the laser beam L1 is delayed. In this way, the phase difference is canceled and the deviation between the beams can be corrected.

In accordance with the index signals S1 and S2, the start of recording of the laser beams L1 and L2 is controlled, and image recording is actually carried out (2ST10).

When the index signals S1, S2 of the laser beams L1, L2 are generated in the manner described above, even when the deviations of the laser beams L1, L2 in the primary scanning direction are not constant, the index signals S1, S2 highly accurately corresponding to the deviation can be generated. In this way, in accordance with the index signals S1, S2, an accurate recording start command can be issued.

When the delay time is corrected by the deviation time $T_h$, even if the sensors A, B are inclined, the occurrence of errors in the index signals S1, S2 can be finally avoided, so that image recording can be highly accurately carried out while the inclination of the sensors A, B is allowed.

In the example shown in FIG. 15, while the laser beam L1 takes the lead in the scanning, the deviation is generated. This relation may be reversed. In this case, when the detection signal of the sensor A is delayed by the time $T_R$, a signal, the rise of which is delayed as compared with the detection signal of the sensor B, can be provided. Accordingly, it is not necessary to mind which of the laser beams L1 and L2 takes the lead in the scanning, and the appropriate index signals S1 and S2 can be provided by a simple processing.

It is sufficient that the sensors A and B output signals only expressing the results of detection of the laser beams L1 and L2. Accordingly, high accuracy is not required for the output characteristics of the sensors.

In this connection, instead of storing the deviation time $T_h$, data of distances of the point b1 and b2 in the primary scanning direction shown in FIG. 16 is stored, and the deviation time $T_h$ may be calculated from the distance data and the scanning speed each time.

The deviation time $T_h$ is found as follows.

When the deviations of the scanning positions of the laser beams L1, L2 in the primary scanning direction are in the initial set condition, that is, when the unit is in the initial condition, a deviation between the detection interval $T\phi$ of the laser beam L1 shown in FIG. 15 and the detection interval T2 of the sensors A, B when the laser beams L1, L2 are individually detected by the sensors A, B must correspond to the deviation of the primary scanning positions of the beams L1, L2 that has been initially set.

In the case where the deviation does not coincide with the initial data of the primary scanning position, the error expresses a distance between the points b1 and b2 in the primary scanning direction, wherein the distance is baed on the inclination of the sensor B.

Accordingly, in the initial condition, the time $T\phi$ and T2 is measured, and the deviation of the scanning positions of the beams L1, L2 in the primary scanning direction detected by the sensors A, B as the deviation of the time $T\phi$ and T2 is detected, and a deviation between the detected deviation of the primary scanning position and the initial data of the deviation is set as the deviation time $T_h$. The deviation time $T_h$ is stored in the memory and used for the correction of the delay time when the index signal corresponding to the deviation of the primary scanning position is generated in accordance with the delay of the detection signal.

In this case, processing may be carried out for generating a normal index signal under an initial condition. In this way, the deviation time $T_h$ can be simply provided.

It is also possible that the scanning positions of the laser beams L1, L2 in the primary scanning direction are forcibly made to coincide with each other, and the time $T\phi$ and the time T2 are measured, and then the deviation of the time $T\phi$ and the time T2 is set the deviation time $T_h$ described above.

When the laser beams L1 and L2 are scanned in the primary scanning direction without causing the deviation, the time $T\phi$ must coincide with the time T2, and the deviation between them expresses a distance between the points b1 and b2 in the primary scanning direction. After the deviation time $T_h$ has been found and stored in this way, the beams L1 and L2 are adjusted to a predetermined scanning positional relation so as to conduct image recording. When the operation is carried out in this manner, even if the sensors are inclined, it is possible to generate an index signal in accordance with the scanning positional relation in the primary scanning direction of the laser beams L1, L2 and to record an image of high quality.

When the deviation time $T_h$ is found in the manner described above, a difference between the time $T\phi$ and the time T2 is generated only by the inclination of the sensor, so that the deviation time $T_h$ can be highly accurately detected.

In the image forming apparatus of the above example, the two laser beams L1, L2 are used, however, it is possible to adopt an image forming apparatus in which not less than three laser beams simultaneously conduct scanning.

For example, when three laser beams L1, L2, L3 are used, three light receiving sections A, B, C aligned in the primary scanning direction are provided as the index sensor 39. When each of the sensors A, B, C detects the laser beam L1, an interval of the detection time is measured. Then the sensor A detects the beam L1, the sensor B detects the beam L2, and the sensor C detects the beam L3. At this time, the detection signal of the sensor A is delayed by a period of time corresponding to the interval between the sensors A and C and also delayed by the deviation time corresponding to the inclination of the sensor, and the detection signal of the sensor B is delayed by a period of time corresponding to the interval between the sensors B and C and also delayed by the deviation time corresponding to the inclination of the sensor.

In other words, when the same laser beam is detected by each sensor, information about the sensor interval can be obtained. Then each sensor is individually made to detect the laser beam so that a detection signal is outputted. Then a detection signal of the sensor on the start side of the primary scanning is delayed by the above interval time so that the detection signal can agree with the detection time of the sensor closest to the end side in the primary scanning direction. In the case of delay processing, the delay time may be corrected by the deviation time corresponding to the inclination of the sensor that has previously been found.

In this case, differences of the output time (time Tφ and time T2) of the detection signals sent from the sensor A and B are measured, for example, by the method shown in FIG. 9.

In FIG. 9, dl0 is a reference clock. Clocks dl1 to dl15 are generated, the phase of which is different from each other by 1/16 period of this reference clock. In this connection, only the clocks dl0, dl1, dl2, dl10 and dl12 are shown in FIG. 7, and other clock are omitted in the drawing.

For example, when a clock synchronized with the rise of the detection signal of the sensor A, that is, a clock first rising immediately after the rise of the detection signal is the clock dl10, the rise of this clock dl10 is successively counted.

In this counting process, the detection signal of the sensor B rises, and when the clock dl12 synchronizes with this rise of the detection signal, the output time difference between the detection signals of the sensors A and B is found in the following manner:
A value obtained when 1 is subtracted from the counted number of the rise of the clock dl10, the counted number including the rise of the clock dl10 synchronized with the detection signal of the sensor A, is multiplied by the clock period. The thus obtained value is added by the phase difference between the clocks dl10 and dl12. The value obtained in this way is the output time difference between the detection signals of the sensors A and B.

When the time is measured in the above manner, the delay time is given by the magnification of the clock period and the phase difference of the delayed clock. Therefore, the detection signal of the sensor can be delayed by the circuit construction illustrated in FIG. 10.

As illustrated in FIG. 10, a plurality of steps of shift registers 71 are connected in series. Shift registers 71 are selectively given the clocks dl0 to dl15 described above. Further, a plurality of steps of deviation outputs of the shift registers 71 are outputted to the selector 72. From the selector 72, one of the deviation outputs is selectively outputted as a delay signal.

In this case, as illustrated in FIG. 9, when the rise of the detection signal of the sensor A synchronizes with the clock dl10, and also when the rise of the detection signal of the sensor B synchronizes with the clock dl12, and also when the detection signal of the sensor A is delayed by the measured time (in this case, the sensors are not inclined), the clock dl12 is given to each shift register 71. In this way, when the clock dl12 is given to each shift register 71, the signal is delayed by an amount corresponding to the fraction that can not be expressed by the clock period, and the shift register 71 is operated.

Concerning the output of each shift register 71, 1 is subtracted from the counted number of the clock dl10. A signal deviated in accordance with the thus obtained number may be selected by the selector 72 and outputted. For example, in the case where the counted number of the clock is 3, the output of the shift register of the second step delayed by an amount of 2 periods may be selected by the selector 72. When the delay time Tφ is corrected by the inclination of the sensor, it is clear that the delay processing can be carried out in the same manner.

In the above example, the delay processing is carried out in accordance with the delay time $T_R$, wherein the delay time $T_R$ is defined as [Sensor interval time Tφ]+[Deviation time $T_h$ for correction with respect to the sensor inclination]. As a result, the index signals S1 and S2 are obtained which have a phase difference corresponding to the deviation of the scanning positions of the laser beams L1 and L2 in the primary scanning direction. Alternatively, the index signals S1 and S2 corresponding to the laser beams L1 and L2 may be obtained in the following manner:

The deviation time between the laser beams L1 and L2 in the primary scanning direction is actually calculated. When the detection signal is delayed in accordance with this deviation time, a phase difference between the delayed detection signal and the original detection signal corresponds to the deviation of the primary scanning position. In this way, the index signals S1 and S2 are provided.

Figure 17:
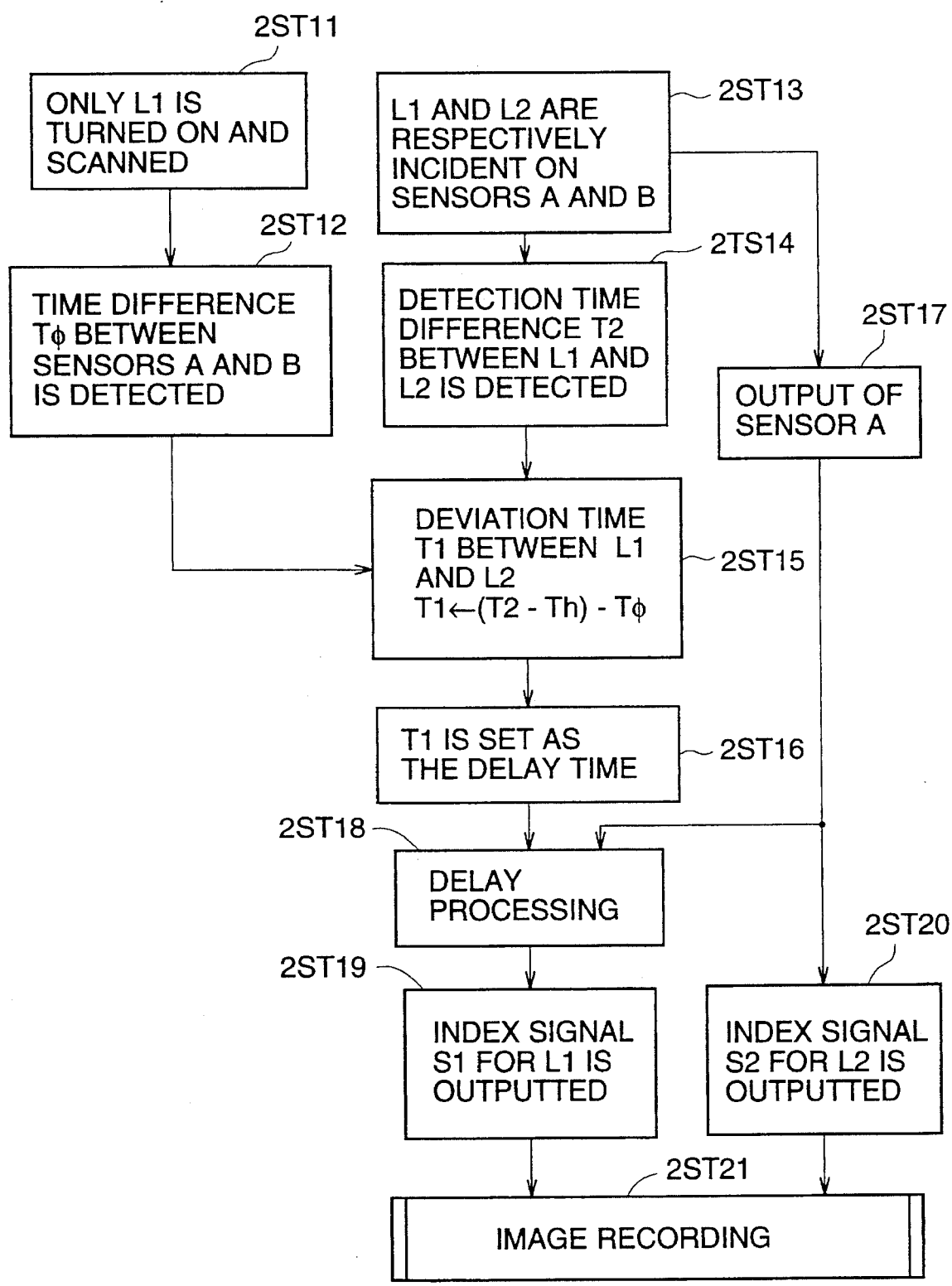
FIG. 17 is a flow chart showing the second example of synchronization signal generating control.

With reference to the flow chart shown in FIG. 17 and the time chart shown in FIG. 18, such an example will be explained as follows.

First in the same manner as the example described before, when only the laser beam L1 is turned on and scanned, the time interval Tφ between the sensors A and B is measured (2ST11, 2ST12).

Then the laser beams L1 and L2 are selectively detected by the sensors A and B, so that the detection signal of the laser beam L1 is provided by the sensor A, and the detection signal of the laser beam L2 is provided by the sensor B (2ST13). At this time, the time difference T2 of the generation of the detection signal is measured (2ST14).

In the case where the laser beams L1 and L2 are not deviated in the primary scanning direction, the time Tφ must coincide with the time T2. Therefore, the difference T1 (T2−Tφ) between them corresponds to the deviation of the scanning position of the laser beams L1 and L2 in the primary scanning direction. In the case shown in FIG. 10, it is shown that the laser beam L2 is delayed with respect to the laser beam L1 in the scanning process.

Also in this case, when the sensors are inclined, the time difference T1 does not become a value correctly expressing the deviation of the scanning position. Therefore, also in this example, the deviation time $T_h$ caused by the sensor inclination is previously stored, and the time T2 is corrected by the deviation time $T_h$, so that the normal detection time is obtained, wherein the normal detection time is the time in the case where the sensor B is not inclined. In the inclination of the sensor shown in FIG. 16, the deviation time $T_h$ is stored as a positive value. Then, in the correction of the time T2, T2-$T_h$ expresses a detection interval in the case where there is no inclination.

In the calculation of the time T1 corresponding to the deviation of the primary scanning position between the beams L1 and L2, it is made to be T1←(T2-$T_h$)-Tφ. In this way, it is prevented that the deviation of the primary scanning position is erroneously detected due to the inclination of the sensor.

The detection signal (2ST17) detected by the sensor A is used as the index signal (synchronization signal) S2 of the delayed laser beam L2, so that the laser beam L2 is advanced (2ST20), and the signal (2ST16, 2ST18) provided when the detection signal of the sensor A is delayed by the deviation time T1 is used as the index signal (synchronization signal) S1 (2ST19) of the laser beam L1, so that the laser beam L1 is delayed. In this way the phase difference can be canceled between the beams.

That is, the primary scanning is carried out while the laser beam L2 is delayed by the time T1 with respect to the laser beam L1, and the detection signal of the sensor A is outputted corresponding to the laser beam L2. Therefore, when the detection signal of the sensor A is delayed by the time T1, this delay signal is outputted in accordance with the primary scanning position of the laser beam L1.

In accordance with the index signals S1 and S2, the recording start position is controlled, and image recording is carried out by the laser beams L1 and L2 (2ST21).

Also, in the above example, the deviations of the laser beams L1 and L2 in the primary scanning direction are actually found, and the delay processing is carried out in accordance with the deviations. In this way, the index signals S1 and S2 corresponding to the laser beams L1 and L2 are generated. Accordingly, even if the deviations are not constant, highly accurate index signals S1 and S2 can be provided.

In the detection of the deviation of the primary scanning position, a correction is made to the inclination of the sensor. Therefore, even if the sensors are inclined, it is possible to prevent the occurrence of errors in the generation time of the index signals S1 and S2.

Further, the deviation of the scanning position in the primary scanning direction can be provided in the form of data. Therefore, it is possible to output data of the deviation of the primary scanning position for another purpose. For example, when the deviation of the scanning position exceeds an allowable range, a warning may be issued.

When the laser beam L2 takes the lead in the scanning operation and the laser beam L1 conducts scanning after the laser beam L2, the following problem may be encountered. In the case of the construction in which the laser beam L1 is incident on the sensor A and the laser beam L2 is incident on the sensor B, the value of T1 is calculated to be negative. Therefore, it is impossible that the index signal S2 corresponding to the laser beam L2 is generated in accordance with the detection signal of the sensor A.

Therefore, in the case where the time T1 has been calculated to be a negative value, the following countermeasures may be taken:
The relation between the laser beams L1 and L2 selectively detected by the sensors A and B in S13 is reversed, so that a laser beam taking the lead in the scanning can be detected y the sensor A. Alternatively, the output of the sensor B by the laser beam L2 is used as a reference, and the output of the sensor B is made to be a horizontal synchronization signal of the laser beam L2, and a signal made when the output of the sensor B is delayed by T1 is made to be a horizontal synchronization signal of the laser beam L1.

In the construction described above in which the deviation time is actually calculated so as to conduct the delay processing, of course, the number of beams may be not less than 3.

In the above example, when the detection signals of the sensors A and B of the index sensors 36 are subjected to delay processing in the index signal generating circuit 37, the index signals S1 and S2 (horizontal synchronization signals) corresponding to the laser beams L1 and L2 are generated. However, the following construction may be adopted: Under the condition that only the laser beam L1 is detected by the sensor A and only the laser beam L2 is detected by the sensor B, the index signals S1 and S2 synchronizing with the detection signals of the sensors A and B are generated. On the other hand, the same data as the delay data of the detection signal in the above example is given to the synchronization circuit 60, and the data clock (dot clock) DCK generated in the synchronization circuit 60 is subjected to a predetermined delay processing. In this way, the data clocks DCK corresponding to the scanning positional relation between the laser beams L1 and L2 may be generated.

As described above, the synchronization signal generating unit of the image forming apparatus for accomplishing the second object of the present invention provides the following effects. In the image forming apparatus in which a plurality of lines are simultaneously recorded when a plurality of lines are simultaneously scanned, when a light beam is detected by the light beam detecting means, a horizontal synchronization signal corresponding to the scanning position of each beam can be positively generated, and further, the generation time of the horizontal synchronization signal can be accurately controlled corresponding to an inclination of the light beam detecting means. Therefore, the quality of an image recorded with a plurality of light beams can be enhanced.

According to the unit described above, data necessary for correcting an inclination of the light beam detecting means can be simply provided in an initial condition.

Also, according to the unit described above, under the condition that the scanning positions are not deviated between the light beams, data necessary for correcting an inclination of the light beam detecting means can be provided. Therefore, it is possible to highly accurately detect the correction data.

According to the unit described above, it is not necessary to finally find the deviation of the primary scanning position between the light beams, and it is possible to generate a horizontal synchronization signal having a phase difference corresponding to the deviation. Further, a horizontal synchronization signal for each light beam can be generated irrespective of the order of the light beams.

According to the unit described above, the deviation of the primary scanning position between the light beams can be provided in the form of data, and it is possible to generate a horizontal synchronization signal for each beam in accordance with the thus obtained data. Further, it is possible to output only the data of the deviation of the primary scanning position so that the data can be used as information.

What is claimed is:

1. An image forming apparatus for simultaneously recording plural image lines on a recording medium by scanning simultaneously with plural light beams along parallel scanning lines in a primary scanning direction, comprising:

a plurality of light beam generators, each for generating a light beam having a beam diameter;

a beam power controller for adjusting electric power supplied to each of the light beam generators so that the beam diameter of each light beam is adjusted;

a deviation detector for detecting deviation of the plural light beams in the primary scanning direction; and a synchronizing circuit for generating a synchronizing signal for each light beam based on the deviation detected by the deviation detector so that each light beam is synchronized with timing of an image recording, the beam power controller adjusting the electric power supplied to each of the light beam generators so that beam diameters of respective light beams are equal before the deviation detector detects deviation.

2. The apparatus of claim 1, wherein the light beam generators are semiconductor laser beam generators, the beam power controller adjusting current of the electric power supplied to the light beam generators so that an optical output of the light beam generators are adjusted a predetermined amount.

3. The apparatus of claim 1, wherein the deviation detector comprises plural beam detectors corresponding in number to the plural light beams, the plural beam detectors being arranged in series in the primary scanning direction within a scanning region and including a leading detector A located at a leading position and a following detector B located at a position succedent to the leading position.

4. The apparatus of claim 3, wherein when the leading and following detectors detect an identical light beam, the deviation detector determines a first detection interval $T\phi$ between a detection signal generated by the leading detector A and a detection signal generated by the following detector B so that the first detection interval $T\phi$ corresponds to a distance between the leading detector A and the following detector B, and when the leading beam detector A detects a first light beam L1 and the following detector B detects a second light beam L2, the deviation detector determines a second detection interval T2 between a detection signal generated by the leading detector A for the first light beam L1 and a detection signal generated by the following detector B for the second light beam L2, the deviation detector determining a deviation T1 by calculating a difference between the first detection interval $T\phi$ and the second detection interval T2.

5. The apparatus of claim 4, wherein the deviation detector uses the detection signal generated by the leading detector A as a reference signal, and the synchronizing circuit generates a synchronizing signal for each of the first and second light beams L1 and L2 based on the deviation T1 so that a deviation between the first and second light beams L1 and L2 is corrected.

6. The apparatus of claim 4, wherein the synchronization circuit delays the detection signal generated by the leading detector A by the first detection interval $T\phi$, determines a difference between the delayed detection signal and the detection signal generated by the following detector B, and generates a synchronization signal for each of the first and second light beams L1 and L2 based on the determined difference.

7. An image forming apparatus for simultaneously recording plural image lines on a recording medium by scanning simultaneously with plural light beams along parallel scanning lines in a primary scanning direction, comprising:

a plurality of light beam generators for generating the plural light beams;

a deviation detector for detecting deviation of the plural light beams in the primary scanning direction, the deviation detector including at least a leading beam detector and a following beam detector arranged in series in the primary scanning direction, and memory means for storing data corresponding to inclination of said detector, the deviation detector generating first timing signals when the leading beam detector and the following beam detector respectively detect an identical light beam, and generating second timing signals when the leading beam detector detects one of the plural light beams and the following beam detector detects another of the plural light beams; and a synchronizing circuit for generating a synchronizing signal for each of the plural light beams based on said data stored in said memory means, the first timing signals, and the second timing signals.

8. The apparatus of claim 7 wherein, when the following beam detector detects two parallel scanning light beams having a known initial deviation therebetween in the primary scanning direction, the deviation detector determines a deviation between detection signals for the two parallel scanning light beams based on the first timing signals, the second timing signals, and the known initial deviation.

9. The apparatus of claim 7 wherein, when the following beam detector detects two parallel scanning light beams having no deviation therebetween in the primary scanning direction, the deviation detector determines a deviation between detection signals for the two parallel scanning light beams based on positional deviation of the following beam detector.

10. The apparatus of claim 7, wherein the synchronizing circuit delays a detection signal generated by the leading beam detector for a detection interval between the first timing signals, determines a difference between the delayed detection signal and a detection signal generated by the following beam detector, and determines a synchronizing signal for each of the light beams based on the determined difference.

* * * * *